(12) United States Patent
Zanpure et al.

(10) Patent No.: US 11,184,339 B2
(45) Date of Patent: Nov. 23, 2021

(54) METHOD AND SYSTEM FOR SECURE COMMUNICATION

(71) Applicant: WIPRO LIMITED, Bangalore (IN)

(72) Inventors: Chaitanya Rajendra Zanpure, Pune (IN); Shivam Mishra, Ghaziabad (IN)

(73) Assignee: Wipro Limited, Bangalore (IN)

( * ) Notice: Subject to any disclaimer, the term of this patent is extended or adjusted under 35 U.S.C. 154(b) by 142 days.

(21) Appl. No.: 16/834,965

(22) Filed: Mar. 30, 2020

(65) Prior Publication Data

US 2021/0306306 A1 Sep. 30, 2021

(30) Foreign Application Priority Data

Mar. 25, 2020 (IN) .............................. 202041013078

(51) Int. Cl.
*H04L 29/06* (2006.01)
*H04L 9/32* (2006.01)
*H04L 9/06* (2006.01)

(52) U.S. Cl.
CPC ........ *H04L 63/0485* (2013.01); *H04L 9/0643* (2013.01); *H04L 9/321* (2013.01); *H04L 63/0442* (2013.01); *H04L 63/061* (2013.01); *H04L 63/123* (2013.01); *H04L 63/168* (2013.01); *H04L 2209/38* (2013.01)

(58) Field of Classification Search
None
See application file for complete search history.

(56) References Cited

U.S. PATENT DOCUMENTS

| 10,142,312 | B2 * | 11/2018 | Johnsrud | H04L 9/3236 |
| 10,454,674 | B1 * | 10/2019 | Bar-El | H04L 9/0637 |
| 10,880,099 | B2 * | 12/2020 | Kumar Ujjwal | G06F 21/577 |
| 2003/0056096 | A1 * | 3/2003 | Albert | H04L 63/108 |
| | | | | 713/168 |

(Continued)

OTHER PUBLICATIONS

Latifa, E., et al., "Blockchain: Bitcoin Wallet Cryptography Security, Challenges and Countermeasures", Journal of Internet Banking & Commerce, 2017, 18 pages.

*Primary Examiner* — Eleni A Shiferaw
*Assistant Examiner* — Hassan A Hussein
(74) *Attorney, Agent, or Firm* — Finnegan, Henderson, Farabow, Garrett & Dunner, LLP

(57) ABSTRACT

A method and system are described for secure communication. The system receives a first secure protocol data packet during an authenticated session to communicate with a user computing device using a secure protocol. The encrypted linked data in first secure protocol data packet is decrypted using a secure key that is dependent on encrypted linked data and user credentials. The system retrieves a second secure protocol data packet from a distributed ledger network that is associated with first secure protocol data packet. The encrypted linked data in second secure protocol data packet is decrypted. The system identifies changes between decrypted linked data of first secure protocol data packet and decrypted linked data of second secure protocol data packet and if changes are identified then first secure protocol data packet is considered as tampered and actions in first secure protocol data packet are not executed, thereby preventing fraudulent execution of transactions.

18 Claims, 11 Drawing Sheets

(56) References Cited

U.S. PATENT DOCUMENTS

| | | | |
|---|---|---|---|
| 2013/0340094 A1* | 12/2013 | Majeti | H04L 51/30 |
| | | | 726/28 |
| 2014/0337930 A1* | 11/2014 | Hoyos | G06F 21/34 |
| | | | 726/4 |
| 2016/0142356 A1* | 5/2016 | Nayak | H04L 51/18 |
| | | | 709/206 |
| 2020/0084222 A1* | 3/2020 | William | H04L 9/0869 |
| 2020/0186332 A1* | 6/2020 | Moeller | H04L 9/088 |
| 2021/0064777 A1* | 3/2021 | Piccinini | G06F 21/6245 |
| 2021/0091934 A1* | 3/2021 | Fletcher | G06Q 20/3829 |

* cited by examiner

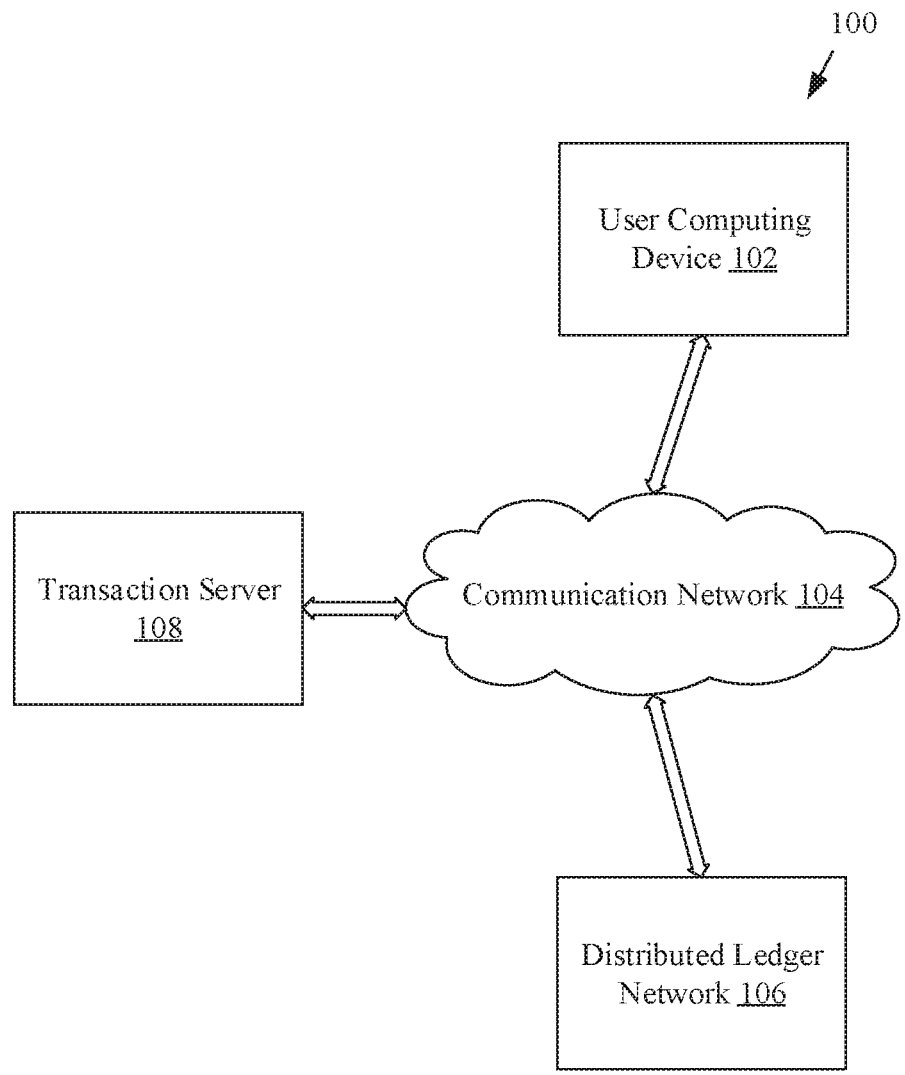
FIG. 1: System Environment 100

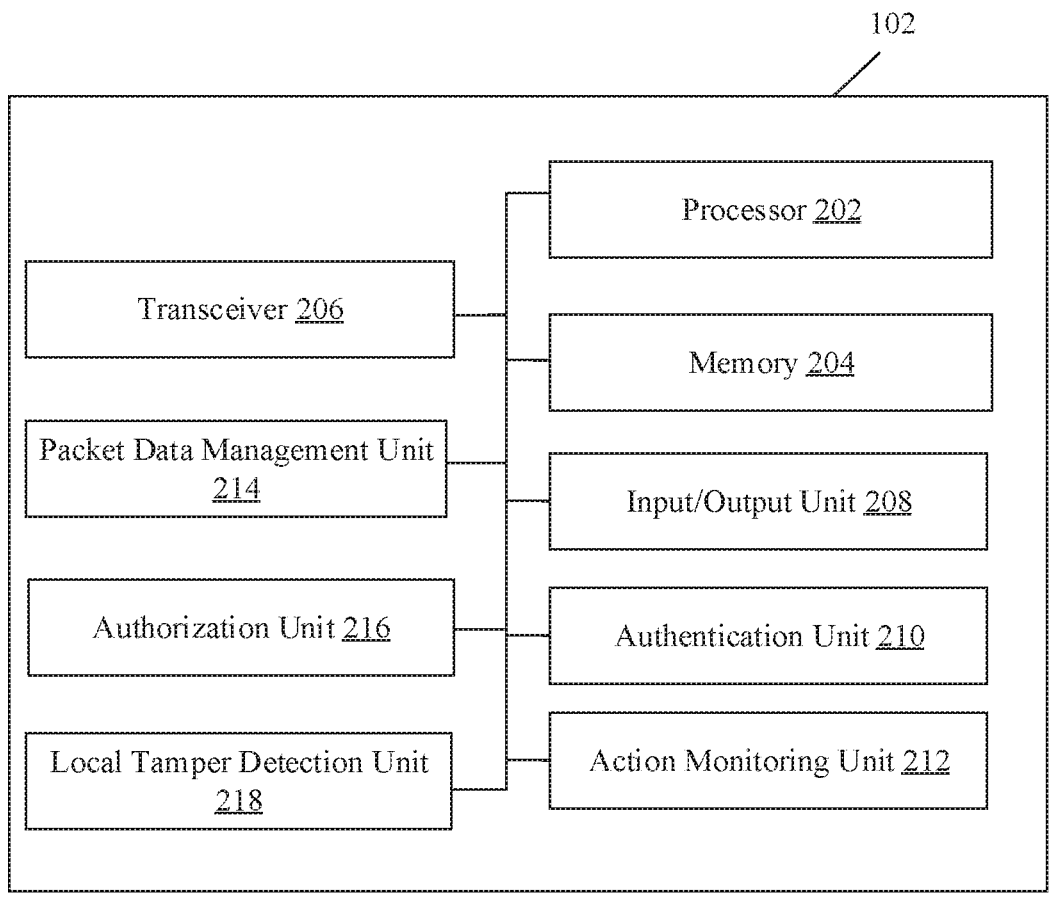
FIG. 2: User Computing Device 102
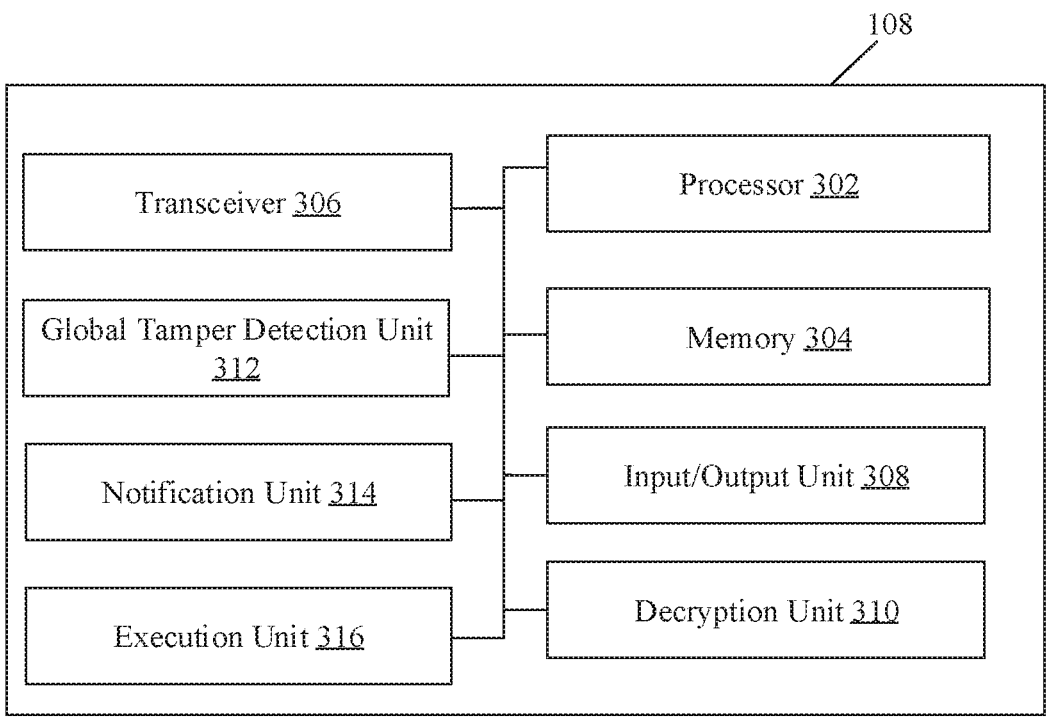
FIG. 3: Transaction Server 108

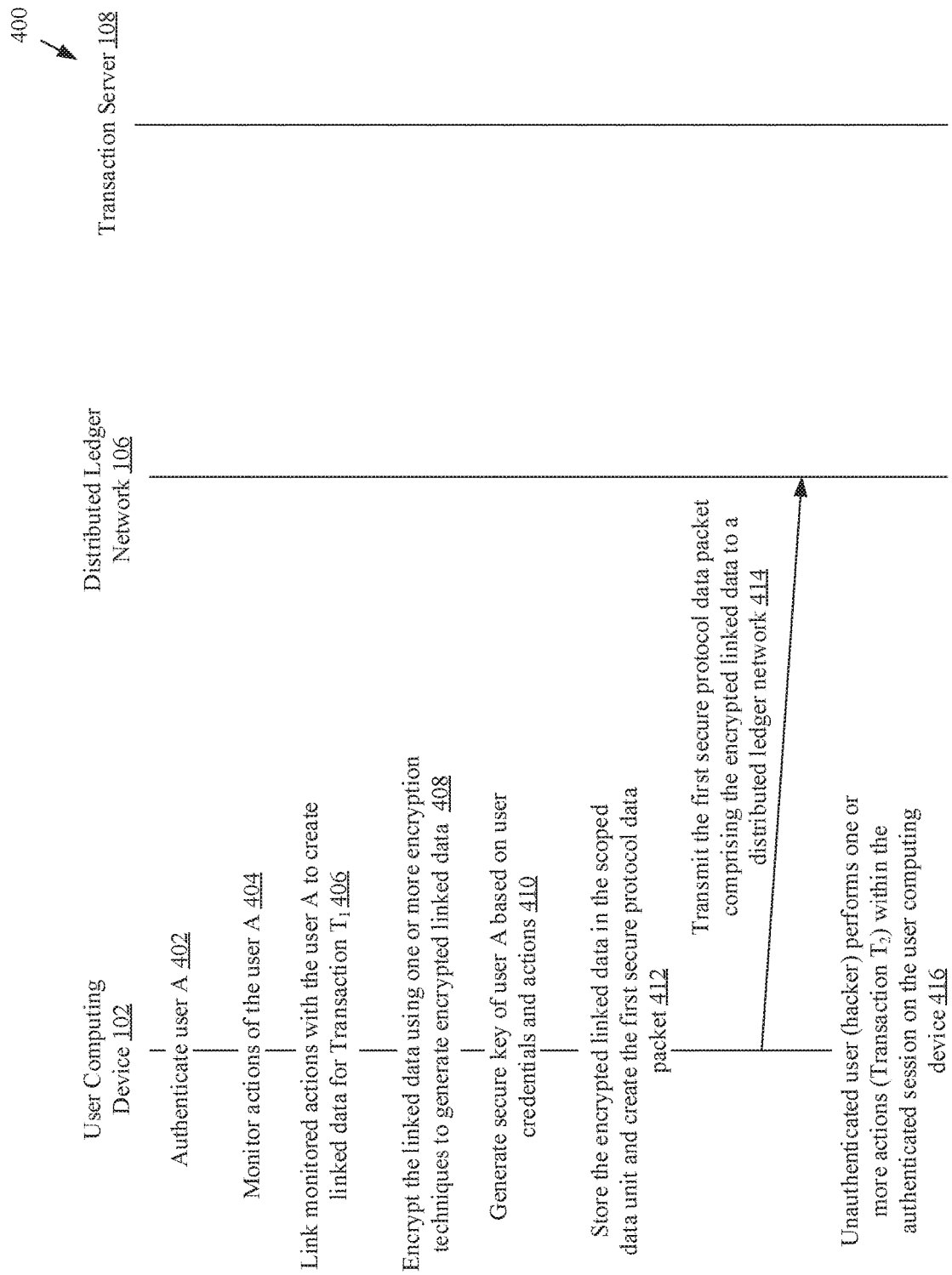
FIG. 4A: Exemplary interaction diagram between a user computing device, a distributed ledger network and a transaction server

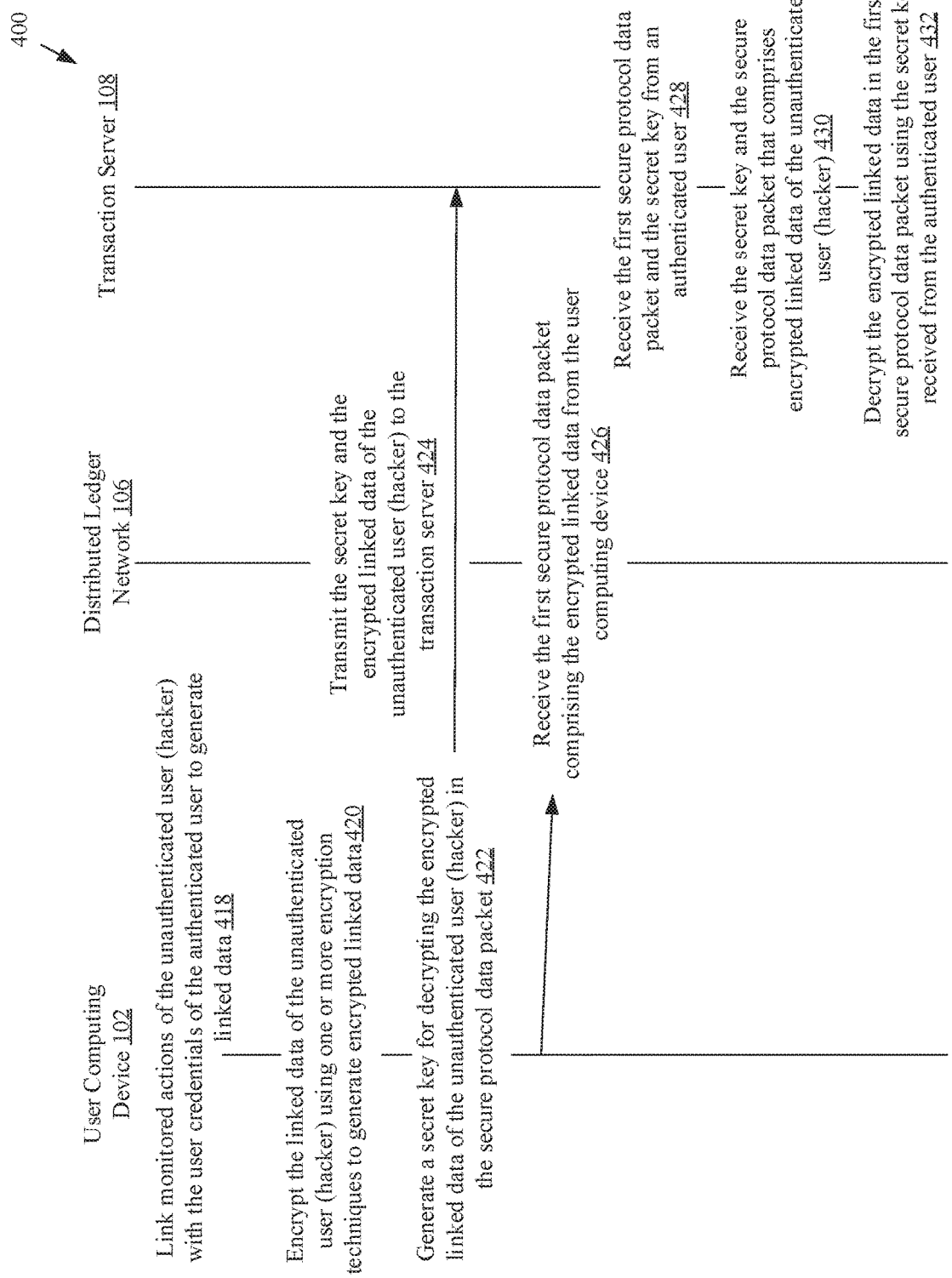
FIG. 4B: Exemplary interaction diagram between a user computing device, a distributed ledger network and a transaction server

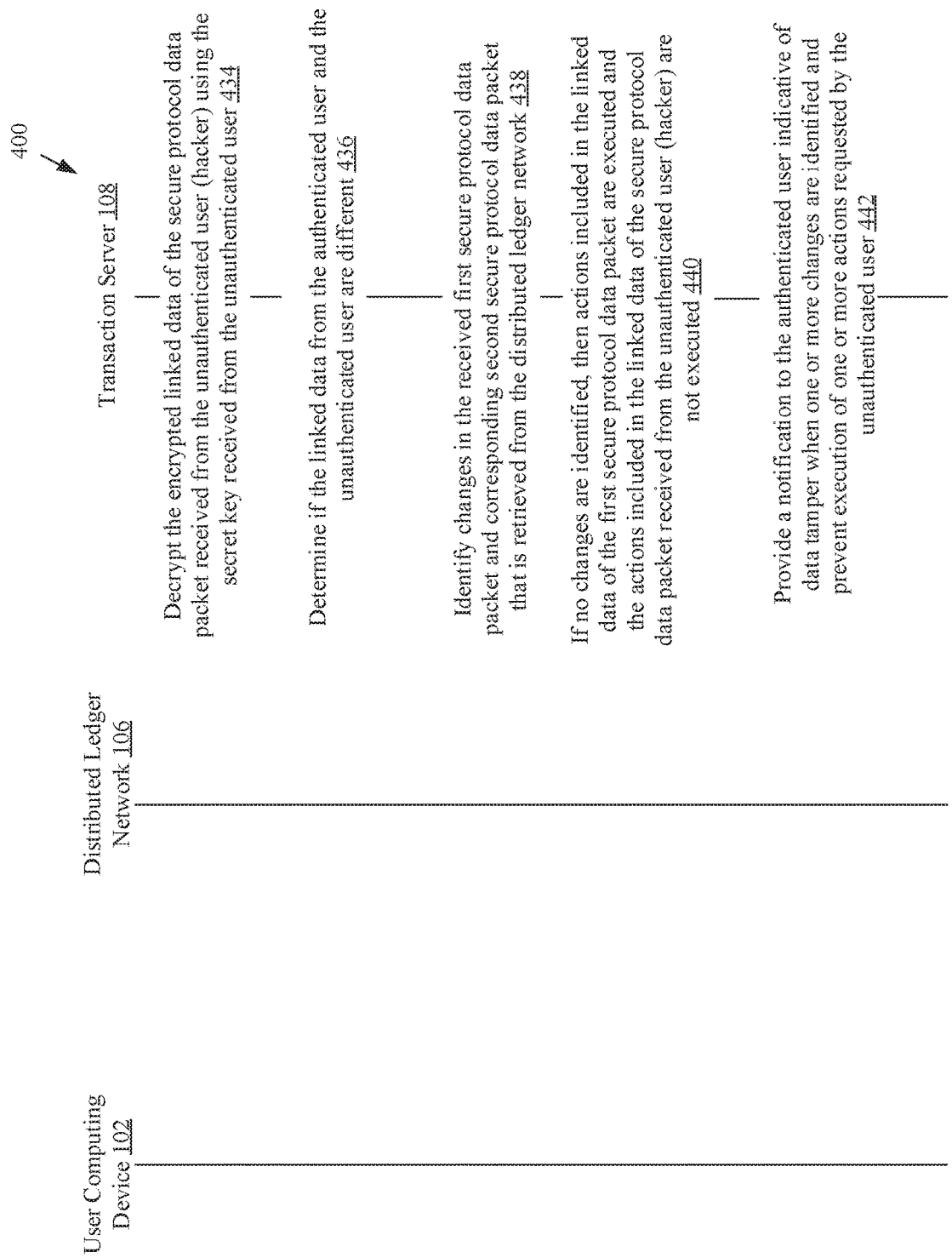
FIG. 4C: Exemplary interaction diagram between a user computing device, a distributed ledger network and a transaction server

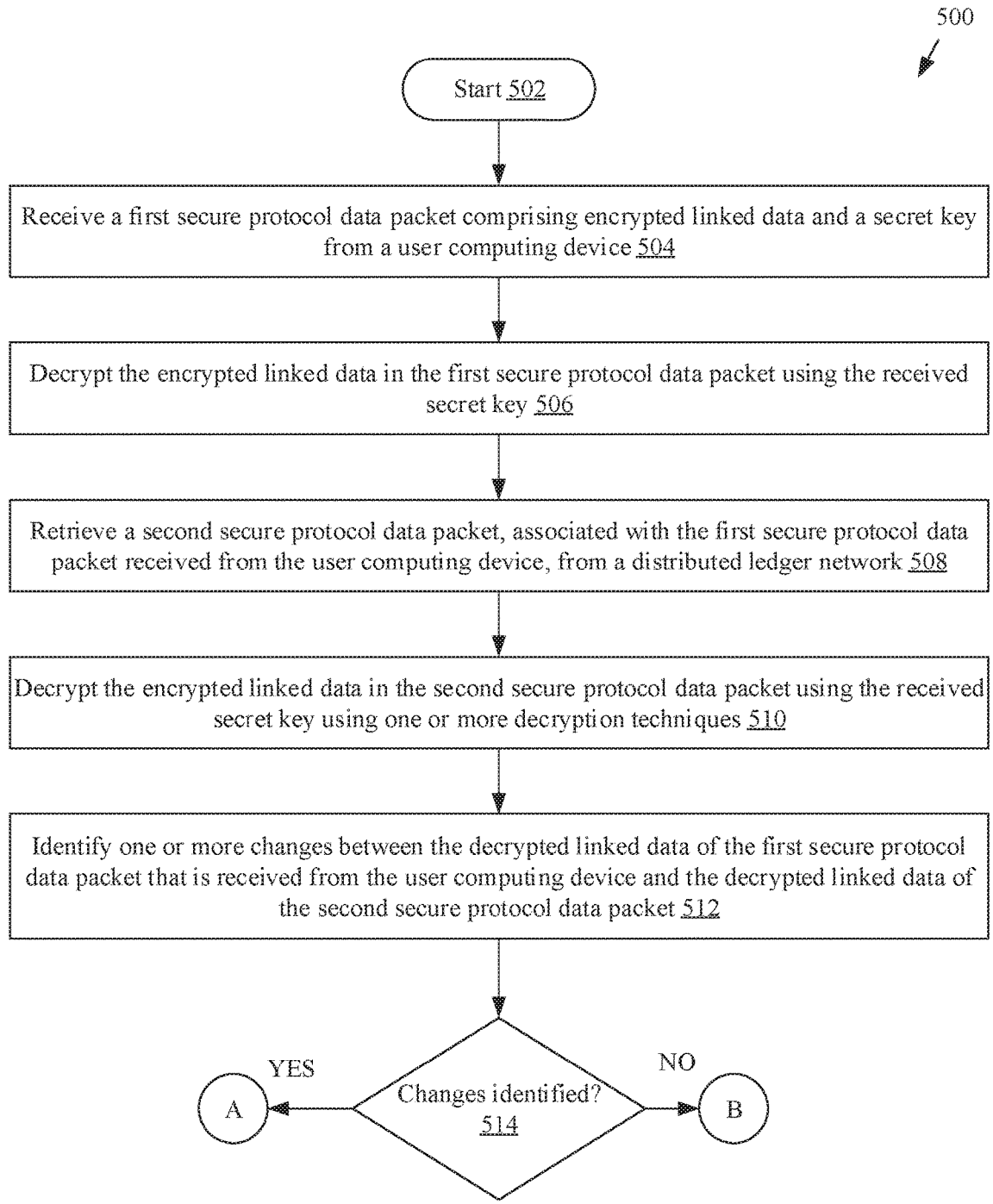
FIG. 5A: Method 500 performed by the transaction server for preventing fraudulent execution of one or more transactions using a secure protocol

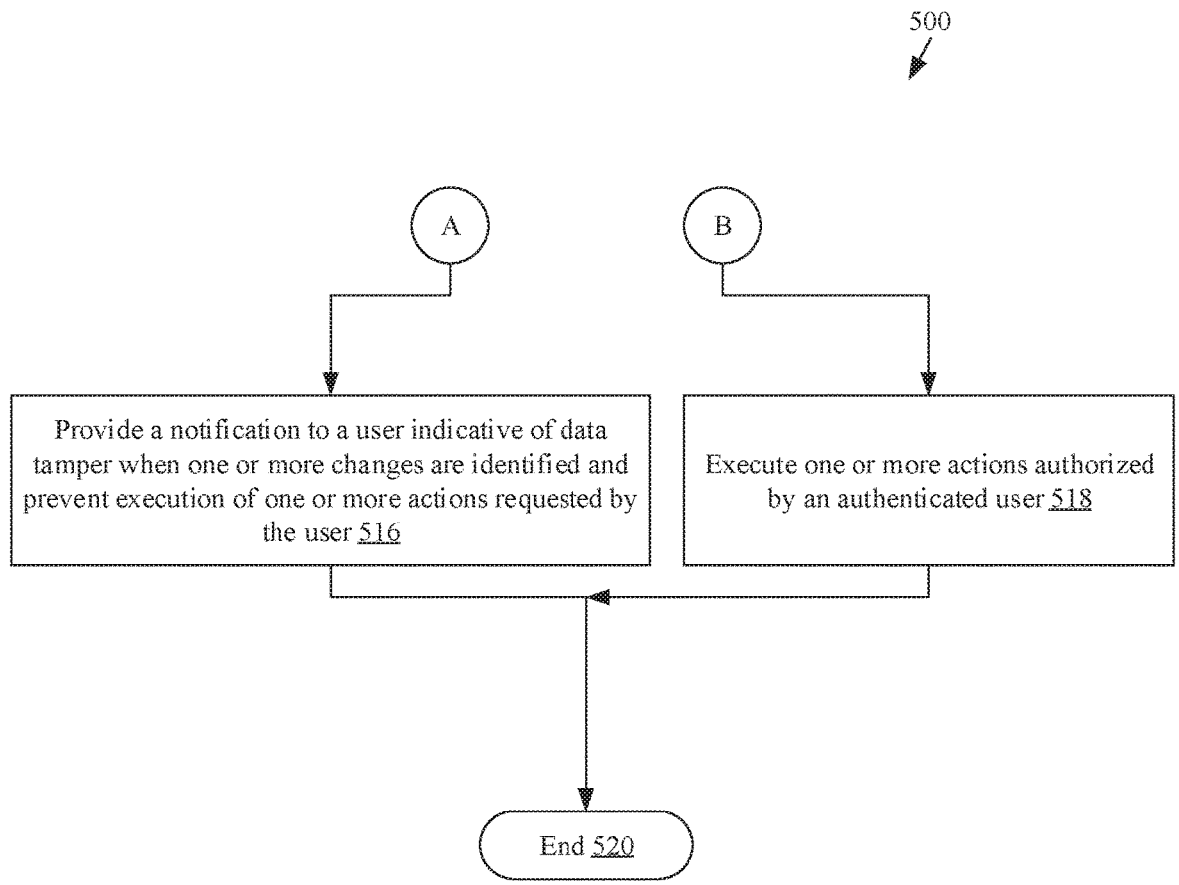
FIG. 5B: Method 500 performed by the transaction server for preventing fraudulent execution of one or more transactions using a secure protocol

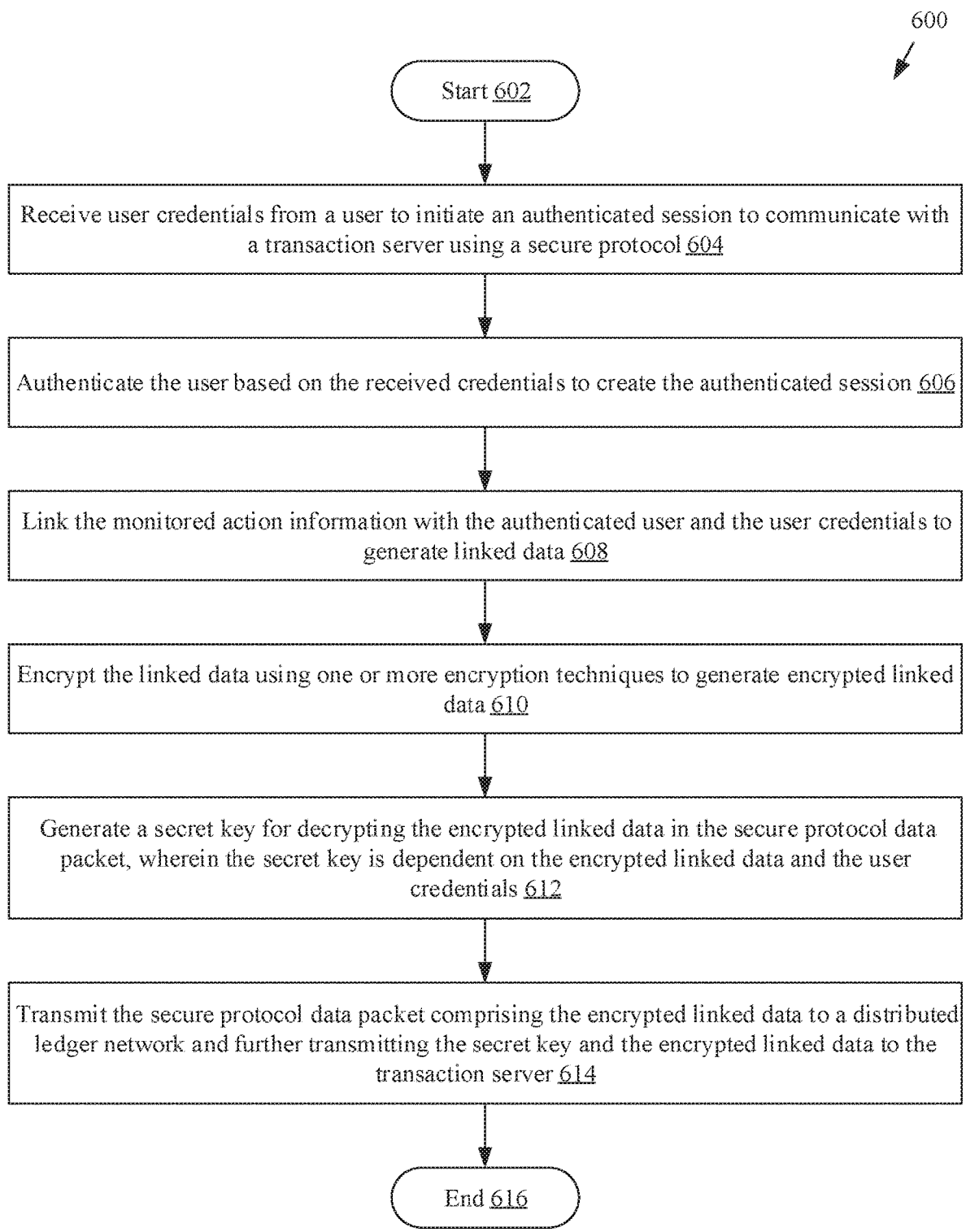
FIG. 6: Method 600 performed by the user computing device for preventing fraudulent execution of one or more transactions using a secure protocol

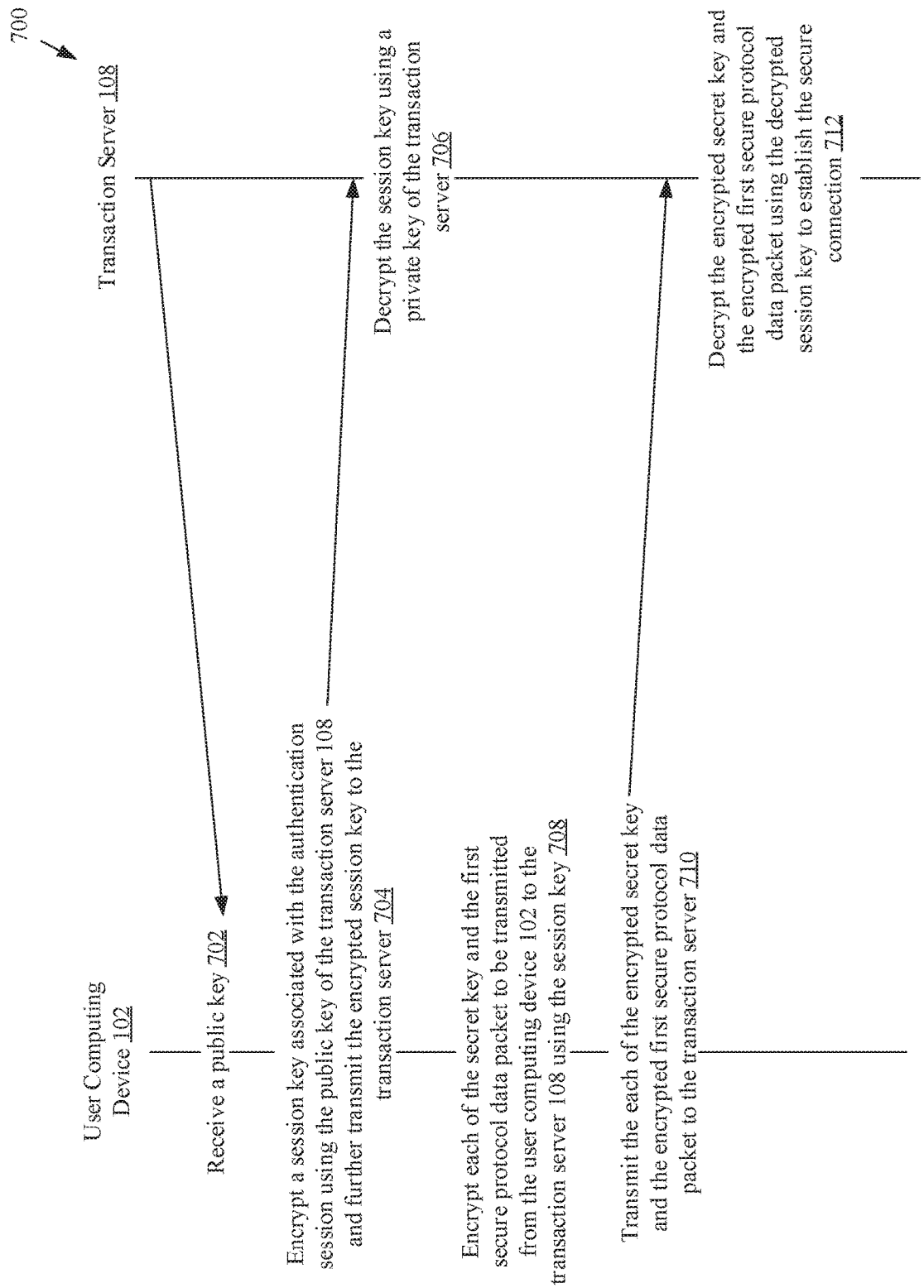
FIG. 7: Exemplary interaction diagram between a user computing device and a transaction server for establishing a secure link for exchange of encrypted linked data and a secret key

| |
|---|
| Message version number 802 |
| Message identifier 804 |
| Max Msg_Size 806 |
| Message Flags 808     Message security model 810 |
| Message security Parameters 812 |
| Application Context ID 814 |
| Application Name 816 |
| Encrypted Linked data 818 |
| Data unit control fields 820 |
| Variable Bindings 824 |

FIG. 8A: Exemplary format of the fields of the secure protocol data packet

| Field Name | Syntax | Size | Description | | | |
|---|---|---|---|---|---|---|
| Msg version number | Integer | 4 bytes | Describes the version number of the protocol | | | |
| Message identifier | Integer | 4 bytes | Used as an identification number. It is matched with request and response messages during communication | | | |
| Max Msg_Size | Integer | 4 bytes | The maximum size of message the sender of this message can receive | | | |
| Message Flags | Octet String (8 bits) | 1 byte | Controls processing of the message and the packet: | | | |
| | | | Sub filed name | Size | Description | |
| | | | Reserved | 3 bits | Reserved for future use | |
| | | | Blockchain Flag | 1 bit | When set to 1, Indicates that blockchain based authentication and authorization is used | |
| | | | Report Flag | 1 bit | When set to 1, a device receiving this message must send back a report of the error status of the agent | |
| | | | Privacy Flag | 1 bit | When set to 1, indicates that the message is encrypted to protect privacy of message | |
| | | | Authorization Flag | 1 bit | When set to 1, indicates that message data has been authorized by an authenticated user. For this bit to be set as 1, authentication Flag MUST be = 1. | |
| | | | Authentication Flag | 1 bit | When set to 1, indicates authentication was used to protect authenticity of message | |
| Msgsecurity model | Integer | 4 | An integer value indicating which security model was used for this message. | | | |
| Message security Parameters | - | Variable | For USM: the entity receiving the data unit will have access only to Message identifier, Message Flags and Encrypted Linked data. For VACM: the entity receiving the data unit will have access only to previous transaction patterns/parameters | | | |
| Scoped data unit | - | Variable | Sub filed name | Syntax | Size | Description |
| | | | Application Context ID | Octet String | Variable | Used to identify which application is associated with the packet being transmitted |
| | | | Application Name | Octet String | Variable | Includes object identifier specifying application context associated with data unit |
| | | | Encrypted Linked data | Octet String | Variable | Includes encrypted linked information |
| | | | Message body | | Variable | Data unit to be transmitted |

FIG. 8B: Exemplary format of the fields of the secure protocol data packet

METHOD AND SYSTEM FOR SECURE COMMUNICATION

TECHNICAL FIELD

The present subject matter is related, in general to communication networks, and more particularly, but not exclusively to a method and a system for transmission of packet data in communication networks using a secure protocol for enhanced security.

BACKGROUND

Typically, "trusted platform module" (TPM) is configured to provide secure computing environments by creating trust relationships between computing platforms to enhance authentication, integrity, confidentiality, and control associated with transactions between the platforms. However, approaches to content protection and cyber security remains a significant problem. A related security problem arises when the operating system can directly access the TPM, and the user, in communication with the computer, may not be aware of the fact that who is controlling the computer. Thus, if the user's wallet is compromised, then the unauthorized user may access the TPM. The existing TPMs does not provide any mechanism for binding the identity of the user to the user's cryptography keys and other confidential information that should be bound to the user's true identity.

Another problem associated with the existing TPMs is the lack of secure connection between the authentication of a valid user, and the authorization of an action. Generally, the authorization of an action includes the execution of a financial transaction from a user's cryptocurrency account, a stock trade in a user's brokerage account, the execution of an important functionality on the electrical arid, or access to important data on a private network. In the known TPMs, the authorization of an action occurs through the web browser since the web browser provides a convenient interface for user. However, on a web browser the link between authentication of a user and authorization of an action can be broken and hence secure connection is not established. Thus, due the lack of a secure and direct link between authenticating the user's wallet and authorizing the action renders the act of user verification irrelevant.

Another problem related with the existing authentication and authorization processes is that the one or more authorization actions may be hijacked by executing a Trojan attack on the user's wallet. A Trojan attack is an attack in which the attacker pretends to be the user and/or the other system to which the user is communicating with. In other words, a valid, authorized user cannot verify that the action he or she is trying to execute is what is actually being executed, because a third party may be masquerading as the other system. The browser cannot be trusted even when using Public Key Infrastructure (PKI) and one-time passcodes.

Another problem related with the existing authentication and authorization processes is that after the user has been authenticated and the initial transaction approved, the remainder of the session is assumed to be secure and all actions after authentication are assumed to be legitimate, without performing any further checks. Thus, any type of authentication system may be circumvented.

Additionally, in other existing TPMs, the static authentication factors, such as passwords, PINS and biometrics, may be entered directly into the user's wallet or stored on computers that may be accessed in the network domain. Generally, one or more network domains including the host domain and network are untrusted environments and hence makes said static authentication factors vulnerable to phishing attacks in the host domain or causes security breaches in the network domain. Furthermore, in said TPMs, the biometric factors are immutable, and if an immutable biometric factor is compromised, then the reuse of the compromised biometric factor reduces the security of the system.

Additionally, using state of the art tools it is easily possible to perform a man-in-the-middle attack on communication protocols, such as Secure Socket Layer (SSL) and Transport Layer Security (TLS). In a first scenario, a hacker redirects an authenticated user to perform transaction T1 and performs another transaction T2. via the session using which the authenticated user had logged in. An SSL session can be hacked easily by using known instructions sets, such as "SSL split". A hacker, by use of such mechanisms, can initiate two parallel transactions from a user computing device within the same authenticated session. In other words, a hacker can perform a transaction while an authenticated user performs another transaction and both of these transactions are executed by a transaction server as both the transactions were initiated in the authenticated session. Thus, after an authenticated user enters his/her credentials the authenticated session is created and after that the "SSL split" is used by the hacker to initiate a parallel transaction. Now the hacker can perform actions within the authenticated session and the transaction server will execute the transactions as the actions are being performed in an authenticated session. However, the authenticated user has not authorized such transactions which leads to fraudulent execution of transactions.

In another scenario, the hacker may change data in the same packet for a transaction "T1" en route, as there is no secure link between two devices for exchange of data. Currently, during an established authenticated SSL session if the data is modified then there is no way of checking at the transaction server for such modification/tampering of data.

As illustrated above, there is no secure link between two devices for exchange of data and further there is no way to detect whether an action that is to be executed by a transaction server is authorized by an authenticated user. Additionally, as there is no secure link between devices hence data packets may be manipulated on route and wrong actions may be executed by the transaction server.

Currently, all major financial institutions allow parallel access to online website banking as well as mobile app based banking. Thus, parallel transactions for the same user credentials is allowed. This system has a major technical flaw because if a hacker comes to know that if the online website banking is being used and in parallel mobile app was being used then the hacker can change the data in the transaction being performed using the mobile app and as current systems allow both transactions from the mobile app and the online banking website, hence both the transactions received for the same credentials will be executed by the transaction server as there is no validation of authorization performed by the transaction server.

Additionally, when a user is performing an operation/transaction in an authenticated session, a hacker may redirect the authenticated user to another website which has a different session and the currently initiated session by the authenticated user is used by the hacker to initiate another transaction. Thus, the transaction server will receive two transactions for the same user credentials. Currently, an SSL session can be hacked and can be split into two fully separate sessions. As a result of the attack, these two sessions will have different session keys and may also use different cipher suites and protocol versions. Thus, two parallel sessions are established. The actual user never understands that two sessions have been initiated as the certificates do not provide any errors and the certificate storage is tampered with. Using such techniques another transaction can be initiated by the hacker and the transaction server executes this transaction, which should not have happened ideally. Thus, the existing systems allow multiple transactions to be initiated from either a mobile app or online banking and data can be intercepted and modified in either of the transactions. Further, there is no validation whether the initiated transaction was authorized by the authenticated user.

One of the major technical problem that needs to be addressed is that the transaction server needs to validate the transactions before they are executed. Currently, the transaction server cannot verify whether the transaction that was received by it was authorized by the correct authenticated person. Presently, it is considered that post authentication of a user session, whatever actions are performed in the session, all of them are being authorized by the authenticated user. However, in the aforementioned scenarios the authorization is done by some other person such as a hacker and the authenticated user is not aware of such a transaction. When such a transaction reaches the transaction server, the transaction server recognizes that transaction came from an authenticated used and thus the transaction is executed, whereas this should not have been the case as it was a fraudulent transaction. In view of all of the above, there is a need for an alternative protocol to overcome the limitations of SSL and to perform validation at a transaction server before any transaction is executed.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a transaction server for secure communication. The transaction server may comprise a processor and a memory communicatively coupled to the processor. The memory stores processor instructions, which, on execution, causes the processor to receive a first secure protocol data packet comprising encrypted linked data and a secret key from a user computing device. In an embodiment, the first secure protocol data packet is received during an authenticated session to communicate with a user computing device using a secure protocol. In an embodiment, the communication comprises exchange of messages using one or more secure protocol data packets for execution of one or more transactions. The processor may be further configured to decrypt the encrypted linked data in the first secure protocol data packet using the received secret key. In an embodiment, the secret key is dependent on encrypted linked data and user credentials. In an embodiment, the secret key is generated using a one-way hash function. The processor may be further configured to retrieve a second secure protocol data packet, associated with the first secure protocol data packet received from the user computing device, from a distributed ledger network. In an embodiment, the second secure protocol data packet associated with the first secure protocol data packet received from the user computing device is identified based on field names comprising Message identifier and Message version number in the first secure protocol data packet. In an embodiment, the second secure protocol data packet corresponds to a secure protocol data packet that comprises the encrypted linked data transmitted by the user computing device to the distributed ledger network. In an embodiment, in the second secure protocol data packet a Blockchain Flag is set, which is indicative that blockchain based authentication and authorization is used. In an embodiment, in the second secure protocol data packet an Authorization Flag is set, which is indicative that message in the second secure protocol data packet has been authorized by an authenticated user. In an embodiment, in the second secure protocol data packet an Authentication Flag is set, which is indicative that authentication was used to protect authenticity of message in the second secure protocol data packet.

The processor may be further configured to decrypt the encrypted linked data in the second secure protocol data packet using the received secret key using one or more decryption techniques. The processor may be further configured to identify one or more changes between the decrypted linked data of the first secure protocol data packet that is received from the user computing device and the decrypted linked data of the second secure protocol data packet. In an embodiment, if one or more changes are identified then the first secure protocol data packet received from the user computing device is considered as tampered. In an embodiment, the identified one or more changes are performed by an unauthenticated user within the authenticated session. The processor may be further configured to provide a notification to a. user indicative of data tamper when one or more changes are identified and prevent execution of one or more actions requested by the user. In an embodiment, the identified one or more changes are reported to the user, thereby preventing fraudulent execution of one or more transactions. The processor may be further configured to execute one or more actions authorized by an authenticated user if no changes are identified in the first secure protocol data packet received from the user computing device and the second secure protocol data packet.

According to embodiments illustrated herein, there may be provided a user computing device for secure communication. The user computing device may comprise a processor and a. memory communicatively coupled to the processor. The memory stores processor instructions, which, on execution, causes the processor to receive user credentials from a user to initiate an authenticated session to communicate with a transaction server using a secure protocol. In an embodiment, the communication comprises exchange of messages using one or more secure protocol data packets for execution of one or more transactions. The processor may be further configured to authenticate the user based on the received credentials to create the authenticated session. The processor may be further configured to monitor one or more actions performed by the authenticated user during the authenticated session. The processor may be further configured to link the monitored action information with the authenticated user and the user credentials to generate linked data. In an embodiment, the linked data comprises information associated with the one or more actions performed by the user in the authenticated session and metadata corresponding to the authenticated session. The processor may be further configured to encrypt the linked data using one or more encryption techniques to generate encrypted linked data. In an embodiment, the encrypted linked data is stored within a secure protocol data packet from the one or more secure protocol data packets. The processor may be further configured to generate a secret key for decrypting the encrypted linked data in the secure protocol data packet. In an embodiment, the secret key is dependent on the encrypted linked data and the user credentials. In an embodiment, the secret key is generated using a one-way hash function. The processor may be further configured to transmit the secure protocol data packet comprising the encrypted linked data to a distributed ledger network and further transmitting the secret key and the encrypted linked data to the transaction server.

According to embodiments illustrated herein, there may be provided a method for secure communication. The method may be performed by a transaction server using a using a secure protocol. The method may include receiving a first secure protocol data packet comprising encrypted linked data and a secret key from a user computing device. In an embodiment, the first secure protocol data packet is received during an authenticated session to communicate with a user computing device using a secure protocol. In an embodiment, the communication comprises exchange of messages using one or more secure protocol data packets for execution of one or more transactions. The method may include decrypting the encrypted linked data in the first secure protocol data packet using the received secret key. In an embodiment, the secret key is dependent on encrypted linked data and user credentials. In an embodiment, the secret key is generated using a one-way hash function. The method may include retrieving a second secure protocol data packet, associated with the first secure protocol data packet received from the user computing device, from a distributed ledger network. In an embodiment, the second secure protocol data packet associated with the first secure protocol data packet received from the user computing device is identified based on field names comprising Message identifier and Message version number in the first secure protocol data packet. In an embodiment, the second secure protocol data packet corresponds to a secure protocol data packet that comprises the encrypted linked data transmitted by the user computing device to the distributed ledger network. In an embodiment, in the second secure protocol data packet a Blockchain Flag is set, which is indicative that blockchain based authentication and authorization is used. In an embodiment, in the second secure protocol data. packet an Authorization Flag is set, which is indicative that message in the second secure protocol data packet has been authorized by an authenticated user. In an embodiment, in the second secure protocol data packet an Authentication Flag is set, which is indicative that authentication was used to protect authenticity of message in the second secure protocol data packet. The method may include decrypting the encrypted linked data in the second secure protocol data packet using the received secret key using one or more decryption techniques. The method may include identifying one or more changes between the decrypted linked data of the first secure protocol data packet, which is received from the user computing device, and the decrypted linked data of the second secure protocol data packet. In an embodiment, if one or more changes are identified then the first secure protocol data packet received from the user computing device is considered as tampered. In an embodiment, the identified one or more changes are performed by an unauthenticated user within the authenticated session. The method may include providing a notification to a user indicative of data tamper when one or more changes are identified and prevent execution of one or more actions requested by the user. In an embodiment, the identified one or more changes are reported to the user, thereby preventing fraudulent execution of one or more transactions. The method may include executing one or more actions authorized by an authenticated user if no changes are identified in the first secure protocol data packet received from the user computing device and the second secure protocol data packet.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system andlor methods in accordance with embodiments of the present subject matter are now described, by way of example only, and with reference to the accompanying figures, in which:

FIG. 1 is a block diagram that illustrates a system environment in which various embodiments of the method and the system may be implemented;

FIG. 2 is a block diagram that illustrates a user computing device configured to perform secure communication using a secure protocol, in accordance with some embodiments of the present disclosure;

FIG. 3 is a block diagram that illustrates a transaction server configured to perform secure communication using a secure protocol, in accordance with some embodiments of the present disclosure;

FIGS. 4A to 4C collectively illustrate an interaction diagram between a user computing device, a distributed ledger network and a transaction server;

FIGS. 5A and 5B collectively depict a flowchart illustrating a method performed by the transaction server for preventing fraudulent execution of one or more transactions using a secure protocol, in accordance with some embodiments of the present disclosure;

FIG. 6 depicts a flowchart illustrating a method performed by the user computing device for preventing fraudulent execution of one or more transactions using a secure protocol, in accordance with some embodiments of the present disclosure; and FIG. 7 illustrates an interaction diagram for establishing a secure link between a user computing device and a transaction server for exchange of encrypted linked data and a secret key.

FIGS. 8A and 8B collectively depict exemplary format of the one or more fields of the secure protocol data packet.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes, which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The disclosed method and system provides identifies tampering of data packets and validates each of the actions included in the data packets before executing the actions using a distributed ledger network. in case tampering of data packets is identified then actions included in the data packets are not executed thereby preventing fraudulent execution of actions andlor transactions. Further, the method and system disclose about monitoring actions performed by an authenticated user during an authenticated session and then further link the monitored action information with the authenticated user and the user credentials to generate linked data. In an embodiment, the linked data comprises information associated with the actions performed by the user in the authenticated session and metadata corresponding to the authenticated session.

Further, the method and system provides a mechanism for secure data packet transfer in communication networks in accordance with a secure protocol in which a private secret key for decrypting the encrypted linked data is generated using a one-way hash function key such that said private key is dependent on the encrypted linked data and the user credentials. The method and system discloses secure protocol that establishes a secure link between the user computing device and the transaction server for exchange of the encrypted linked data and the secret key.

FIG. 1 is a block diagram that illustrates a system environment 100 in which various embodiments of the method and the system may be implemented.

The system environment 100 may include a user computing device 102, a communication network 104, a distributed ledger network 106, and a transaction server 108. The user computing device 102 may be communicatively coupled to the distributed ledger network 106, and the transaction server 108 via the communication network 104. In an embodiment, the user computing device 102, the transaction server 108, and the distributed ledger network 106 may communicate with each other via the communication network 104.

The user computing device 102 may refer to a computing device used by a user. The user computing device 102 may be comprised of one or more processors and one or more memories. The one or more memories may include computer readable code that may be executable by the one or more processors to perform predetermined operations. Further, the user computing device 102 may be configured to present a user-interface to the user to provide the user input. Examples of the user computing device 102 may include, but are not limited to, a personal computer, a laptop, a personal digital assistant (PDA), a mobile device, a tablet, or any other computing device.

The user computing device 102 may be configured to receive user credentials from a user to initiate an authenticated session to communicate with a transaction server 108 using a secure protocol. In an embodiment, the communication may comprise exchange of messages using one or more secure protocol data packets for execution of one or more transactions. The user computing device 102 may be configured to authenticate the user based on the received credentials to create the authenticated session. The user computing device 102 may be configured to monitor one or more actions performed by the authenticated user during the authenticated session. The user computing device 102 may be configured to link the monitored action information with the authenticated user and the user credentials to generate linked data. In an embodiment, the linked data may comprise information associated with the one or more actions performed by the user in the authenticated session and metadata corresponding to the authenticated session.

The user computing device 102 may be configured to encrypt the linked data using one or more encryption techniques to generate encrypted linked data. In an embodiment, the encrypted linked data may be stored within a secure protocol data packet from the one or more secure protocol data packets. The user computing device 102 may be configured to generate a secret key for decrypting the encrypted linked data in the secure protocol data packet. In an embodiment, the secret key may be dependent on the encrypted linked data and the user credentials and the secret key is generated using a one-way hash function. The user computing device 102 may be further configured to transmit the secure protocol data packet comprising the encrypted linked data to a distributed ledger network 106 and further transmits the secret key and the encrypted linked data to the transaction server 108.

The user computing device 102 may be configured to identify one or more changes, associated with the linked data, which are not being performed by the authenticated user during the authenticated session. Such one or more changes may be identified based on an analysis of the monitored one or more actions being performed by the authenticated user and a plurality of historical actions and a plurality of historical transactions performed by the authenticated user. Such analysis is intended to identify actions which have a low likelihood of being initiated by the user, or can be assumed to be unauthorized transactions. To this end, the historical transactions performed by the user may be tracked based on one or more machine learning algorithms, which in turn may use the tracked data to recognize whether any new action performed by the user is authorized or not.

In an embodiment, the one or more changes associated with the linked data may be performed by an unauthenticated user within the authenticated session. The user computing device 102 may be configured to provide a first notification to the authenticated user indicative of data tamper when one or more changes are identified. In an embodiment, user computing device 102 may be configured to provide a second notification to the authenticated user indicative of data tamper when one or more changes are identified and one or more actions requested by an unauthenticated user are not executed. Such a notification facilitates prevention of fraudulent execution of one or more transactions, and further allows for reporting the nature of the identified one or more changes to the user.

In an embodiment, the user computing device 102 may follow a secure protocol in order to establish a secure link between the user computing device 102 and the transaction server 108 for exchange of the encrypted linked data and the secret key. The user computing device 102 may be configured for the same by receiving a public key from the transaction server 108. The user computing device 102 may be configured to encrypt a session key associated with the authentication session using the public key of the transaction server 108 and the transaction server 108 decrypts the session key using a private key of the transaction server 108. The user computing device 102 may be configured to encrypt each of the secret key and the first secure protocol data packet to be transmitted from the user computing device 102 to the transaction server 108 using the session key. The user computing device 102 may be configured to transmit each of the encrypted secret key and the encrypted first secure protocol data packet to the transaction server 108, which decrypts the secret key and the first secure protocol data packet using the decrypted session key.

The communication network 104 may correspond to a communication medium through which the user computing device 102, the transaction server 108 and the distributed ledger network 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, and 6G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The distributed ledger network 106 may be a network of devices that communicate with one another in a peer-to-peer decentralized architecture that store all transactions. The distributed ledger network 106 may be any network and/or combination of networks of devices that communicate with one another (e.g., and combination of the Internet, telephone networks, and/or mobile phone networks) in a peer-to-peer decentralized architecture, storing all transactions publicly using a distributed ledger network. The examples of the distributed ledger network may include, a private Blockchain network, a Hashgraph network, and/or the like.

The distributed ledger network 106 may be configured to receive secure protocol data packet comprising the encrypted linked data from the user computing device 102. The distributed ledger network 106 may be configured to store the secure protocol data packet in a distributed ledger of the distributed ledger network 106 after performing consensus and validation amongst the network of devices in the distributed ledger network 106. The distributed ledger network 106 may be configured to transmit the secure protocol data packet comprising the encrypted linked data to the transaction server 108 in response to a retrieval request received from the transaction server 108. Such a secure protocol data packet may be identified based on one or more field names in the secure protocol data packet.

The transaction server 108 may refer to a computing device or a software framework hosting an application or a software service. In an embodiment, the transaction server 108 may be implemented to execute procedures such as, but not limited to, programs, routines, or scripts stored in one or more memories for supporting the hosted application or the software service. In an embodiment, the hosted application or the software service may be configured to perform one or more predetermined operations. The transaction server 108 may be realized through various types of application servers such as, but are not limited to, a Java application server, a NET framework application server, a Base4 application server, a PUP framework application server, or any other application server framework.

The transaction server 108 may be configured to receive the first secure protocol data packet comprising encrypted linked data and the secret key from a user computing device 102. In an embodiment, the first secure protocol data packet may be received during the authenticated session to communicate with the user computing device 102 using the secure protocol. In an embodiment, the communication may comprise exchange of messages using one or more secure protocol data packets for execution of one or more transactions. The transaction server 108 may configured to decrypt the encrypted linked data in the first secure protocol data packet using the received secret key. In an embodiment, the secret key may be dependent on the encrypted linked data and user credentials. The secret key may be generated using a one-way hash function.

The transaction server 108 may be configured to retrieve a second secure protocol data packet, associated with the first secure protocol data packet received from the user computing device 102, from the distributed ledger network 106. In an embodiment, the second secure protocol data packet associated with the first secure protocol data packet received from the user computing device may be identified based on field names comprising Message identifier and Message version number in the first secure protocol data packet. The second secure protocol data packet corresponds to a secure protocol data packet that comprises the encrypted linked data transmitted by the user computing device 102 to the distributed ledger network 106. In an embodiment, in the second secure protocol data packet a Blockchain Flag is set, which is indicative that blockchain based authentication and authorization is used. In an embodiment, in the second secure protocol data packet an Authorization Flag is set, which indicates that message in the second secure protocol data packet has been authorized by an authenticated user. In an embodiment, in the second secure protocol data packet an Authentication Flag is set, which indicates that authentication was used to protect authenticity of message in the second secure protocol data packet.

The transaction server 108 may be configured to decrypt the encrypted linked data in the second secure protocol data packet using the received secret key using one or more decryption techniques. The transaction server 108 may be configured to identify one or more changes between the decrypted linked data of the first secure protocol data packet that is received from the user computing device 102 and the decrypted linked data of the second secure protocol data packet. If one or more changes are identified then the first secure protocol data packet received from the user computing device 102 may be considered as tampered. In an embodiment, the identified one or more changes may be performed by an unauthenticated user within the authenticated session. The transaction server 108 may be configured to provide a notification to a user indicative of data tamper when one or more changes are identified and prevent execution of one or more actions requested by the user. In an embodiment, the identified one or more changes may be reported to the user, thereby preventing fraudulent execution of one or more transactions. The transaction server 108 may be configured to execute one or more actions authorized by an authenticated user if no changes are identified in the first secure protocol data packet received from the user computing device 102 and the second secure protocol data packet.

In an embodiment, the transaction server 108 follows the secure protocol in order to establish a secure link between the user computing device 102 and the transaction server 108 for exchange of the encrypted linked data and the secret key. The transaction server 108 may be configured for the same by transmitting a public key of the transaction server 108 to the user computing device 102. The public key of the transaction server 108 is used to encrypt a session key associated with the authentication session. The transaction server 108 may be configured to decrypt the session key using a private key of the transaction server 108, and each of the secret key and the first secure protocol data packet to be received from the user computing device 102 may be encrypted using the session key. The transaction server 108 may be configured to decrypt the secret key and the first secure protocol data packet using the decrypted session key.

The transaction server 108 may be further configured to categorize the one or more actions into one of: low risk actions, medium actions and high risk actions, wherein the high risk actions comprise one or more actions related to a financial transaction, application based authentication, privilege elevation, and role elevation, wherein the categorization is performed based on the Application Context ID, and the Application Name.

A person having ordinary skill in the art will appreciate that the scope of the disclosure is not limited to realizing the transaction server 108 and the user computing device 102 as separate entities. In an embodiment, the transaction server 108 may be realized as an application program installed on and/or running on the user computing device 102 without departing from the scope of the disclosure.

FIG. 2 is a block diagram that illustrates a user computing device 102 configured to perform secure communication using a secure protocol, in accordance with some embodiments of the present disclosure. The user computing device 102 comprises a processor 202, a memory 204, a transceiver 206, an input/output unit 208, an authentication unit 210, action monitoring unit 212, a packet data. management unit 214, an authorization unit 216. and a local tamper detection unit 218. The processor 202 may be communicatively coupled to the memory 204, the transceiver 206, the input/output unit 208, the authentication unit 210, the action monitoring unit 212, the packet data management unit 214, the authorization unit 216, and the local tamper detection unit 218.

The processor 202 comprises suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific integrated Circuit (ASIC) processor, a. Complex Instruction Set Computing (CISC) processor, and/or other processor.

The memory 204 comprises suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that may be configured to transmit the secure protocol data packet comprising the encrypted linked data to the distributed ledger network 106. The transceiver 206 may be further configured to transmit the secret key and the encrypted linked data to the transaction server 108. The transceiver 206 may be further configured to receive a public key from the transaction server 108. The transceiver 206 may be further configured to transmit each of the encrypted secret key and the encrypted first secure protocol data packet to the transaction server 108.

The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11 a, IEEE 802.111), IEEE 802.11g and/or IEEE 802.11n), voice over Internet Protocol (VOW), Wi-MAX, a protocol for email, instant messaging. and/or Short Message Service (SMS).

The Input/ Output (I/O) unit 208 comprises suitable logic, circuitry, interfaces, and/or code that may be configured to receive an input or transmit an output. The input/output unit 208 comprises of various input and output devices that are configured to communicate with the processor 202. Examples of the input devices include, but are not limited to, a key board, a mouse, a joystick, a touch screen, a. microphone, and/or a docking station. Examples of the output devices include, but are not limited to, a display screen and/or a speaker.

The authentication unit 210 comprises suitable logic, circuitry, interfaces, and/or code that may be configured to receive user credentials from a user to initiate the authenticated session to communicate with the transaction server 108 using the secure protocol. The authentication unit 210 may be configured to authenticate the user based on the received credentials to create the authenticated session. The action monitoring unit 212 comprises suitable logic, circuitry, interfaces, and/or code that may be configured to monitor one or more actions performed by the authenticated user during the authenticated session.

The packet data management unit 214 comprises suitable logic, circuitry, interfaces, and/or code that may be configured to link the monitored action information with the authenticated user and the user credentials to generate linked data. In an embodiment, the linked data comprises information associated with the one or more actions performed by the user in the authenticated session and metadata corresponding to the authenticated session. The packet data management unit 214 may be further configured to encrypt the linked data using one or more encryption techniques to generate encrypted linked data and the encrypted linked data is stored within the secure protocol data packet.

The authorization unit 216 comprises suitable logic, circuitry, interfaces, and/or code that may be configured to generate a secret key for decrypting the encrypted linked data in the secure protocol data packet. In an embodiment, the secret key is dependent on the encrypted linked data and the user credentials and the secret key is generated using a one-way hash function. The authorization unit 216 may be further configured to encrypt a session key associated with the authentication session using the public key of the transaction server 108. The authorization unit 216 may be further configured to encrypt each of the secret key and the first secure protocol data packet to be transmitted from the user computing device 102 to the transaction server 108 using the session key.

The local tamper detection unit 218 comprises suitable logic, circuitry, interfaces, and/or code that may be configured to identify one or more changes, associated with the linked data, which are not being performed by the authenticated user during the authenticated session. In an embodiment, the one or more changes may be identified based on the comparison of the monitored one or more actions being performed by the authenticated user with a plurality of historical actions and a plurality of historical transactions performed by the authenticated user. Such one or more changes associated with the linked data may be performed by an unauthenticated user within the authenticated session. The local tamper detection unit 218 may be configured to provide a first notification to the authenticated user indicative of data tamper when one or more changes are identified, and further provides a second notification to the authenticated user indicative of data tamper when one or more changes are identified and one or more actions requested by an unauthenticated user are not executed, thereby preventing fraudulent execution of one or more transactions. The local tamper detection unit 218 may be configured to report the identified one or more changes to the user.

FIG. 3 is a block diagram that illustrates a transaction server 108 configured to perform secure communication using a secure protocol, in accordance with some embodiments of the present disclosure. The transaction server 108 comprises a processor 302, a memory 304, a transceiver 306, an input/output unit 308, a decryption unit 310, a global tamper detection unit 312, a notification unit 314, and an execution unit 316. The processor 202 may be communicatively coupled to the processor 302, the memory 304, the transceiver 306, the input/output unit 308, the decryption unit 310, the global tamper detection unit 312, the notification unit 314, and the execution unit 316.

The processor 302 comprises suitable logic, circuitry, interfaces, and/or code that may be configured to execute a set of instructions stored in the memory 304. The processor 302 may be implemented based on a number of processor technologies known in the art. Examples of the processor 302 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 304 comprises suitable logic, circuitry, interfaces, and/or code that may be configured to store the set of instructions, which may be executed by the processor 302. In an embodiment, the memory 304 may be configured to store one or more programs, routines, or scripts that may be executed in coordination with the processor 302. The memory 304 may be implemented based on a Random Access Memory (RAM), a Read-Only Memory (ROM), a Hard Disk Drive (HDD), a storage server, and/or a Secure Digital (SD) card.

The transceiver 306 comprises of suitable logic, circuitry, interfaces, and/or code that may be configured to receive a first secure protocol data packet comprising encrypted linked data and a secret key from a user computing device 102. The transceiver 306 may be configured to retrieve a second secure protocol data packet, associated with the first secure protocol data packet received from the user computing device 1012, from a distributed ledger network 106. In an embodiment, the second secure protocol data packet associated with the first secure protocol data packet received from the user computing device 102 may be identified based on field names comprising Message identifier and Message version number in the first secure protocol data packet. The transceiver 306 may be further configured to transmit a public key of the transaction server 108 to the user computing device 102.

The transceiver 306 may implement one or more known technologies to support wired or wireless communication with the communication network. In an embodiment, the transceiver 306 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 306 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging. and/or Short Message Service (SMS).

The input/ Output (I/O) unit 308 comprises suitable logic, circuitry, interfaces, and/or code that may be configured to receive an input or transmit an output. The input/output unit 308 comprises of various input and output devices that are configured to communicate with the processor 302. Examples of the input devices include, but are not limited to, a keyboard, a mouse, a joystick, a touch screen, a microphone, and/or a docking station. Examples of the output devices include, but are not limited to, a display screen and/or a speaker.

The decryption unit 310 comprises suitable logic, circuitry, interfaces, and/or code that may be configured to decrypt the encrypted linked data in the first secure protocol data packet using the received secret key. In an embodiment, the secret key is dependent on encrypted linked data and user credentials, and the secret key is generated using a one-way hash function. The decryption unit 310 may be configured to decrypt the encrypted linked data in the second secure protocol data packet using the received secret key using one or more decryption techniques. The decryption unit 310 may be configured to decrypting the session key using a private key of the transaction server 108. In an embodiment, each of the secret key and the first secure protocol data packet to be received from the user computing device 102 may be encrypted using the session key. The decryption unit 310 may be configured to decrypt the secret key and the first secure protocol data packet using the decrypted session key.

The global tamper detection unit 312 comprises suitable logic, circuitry, interfaces, and/or code that may be configured to identify one or more changes between the decrypted linked data of the first secure protocol data packet that is received from the user computing device 102 and the decrypted linked data of the second secure protocol data packet. In an embodiment, if one or more changes are identified then the first secure protocol data packet received from the user computing device 102 may be considered as tampered and the identified one or more changes may be performed by an unauthenticated user within the authenticated session. The global tamper detection unit 312 may be further configured to categorize the one or more actions into one of: low risk actions, medium actions and high risk actions. The high risk actions may comprise one or more actions related to a financial transaction, application based authentication, privilege elevation, and role elevation, wherein the categorization is performed based on the Application Context ID, and the Application Name.

The notification unit 314 comprises suitable logic, circuitry, interfaces, and/or code that may be configured to provide a notification to a user indicative of data tamper when one or more changes are identified and prevent execution of one or more actions requested by the user. In an embodiment, the identified one or more changes may be reported to the user, thereby preventing fraudulent execution of one or more transactions. The execution unit 316 comprises suitable logic, circuitry, interfaces, and/or code that may be configured to execute one or more actions authorized by an authenticated user if no changes are identified in the first secure protocol data packet received from the user computing device 102 and the second secure protocol data packet.

In operation, the authentication unit 210 may be configured to receive user credentials from a user to initiate an authenticated session to communicate with a transaction server 108 using a secure protocol. In an embodiment, the communication may comprise exchange of messages using one or more secure protocol data packets for execution of one or more transactions. In an embodiment, the one or more transactions may correspond to e-commerce transactions, financial transactions, and the like. For the purpose of this disclosure, the term transaction may include monetary as well as non-monetary transactions.

For example, a monetary transaction may be defined as a transaction which is a business event that has a monetary impact on an entity's financial statements, and is recorded as an entry in its accounting records. Examples of such transaction may include, but are not limited to, transfer and/or receipt of funds between plurality of financial entities. For example, a non-monetary transaction may be defined as a transaction which is a business event that has no monetary impact on an entity's financial statements. Examples include one of: a user requesting a historical statement of bank account, a user browsing through one or more articles in an e-commerce website and adding items to a cart and the like.

In an embodiment, the secure protocol utilizes one or more secure protocol data packets for communication of messages. The secure protocol defines each of the secure protocol data packet to be of 32-bytes. The secure protocol allows client-server applications to communicate in a way that is designed to prevent eavesdropping, tampering, or message forgery. The secure protocol may be implemented in an application layer (layer 7) of an Open Systems Interconnection model (OSI model). The secure protocol data packet comprises of a scoped. Protocol Data Unit (PDU). The PDU is a specific block of information transferred over a network. In this context, the PDU comprises data received or transmitted by a software application.

The scoped PDU includes one or more fields comprising as depicted and explained in detail in FIGs. 8A and 8B.

After receiving the user credentials from the user to initiate the authenticated session to communicate with the transaction server 108 in accordance with the secure protocol, the authentication unit 210 may be configured to authenticate the user based on the received credentials to create the authenticated session.

Once the authentication is done and the authenticated session is initiated, then the action monitoring unit 212 may be configured to monitor one or more actions performed by the authenticated user during the authenticated session. In an embodiment, the one or more actions may comprise at least one of location of a click event performed by a user, type of event performed by the user, sequence of the click events, copy events, paste events, log-in event, log-out event. The location of the click event indicates the pixel coordinates where the user has performed the action and further it determines the actionable element on the user interface of the application where the click event is performed. The type of event may indicate whether the action was related to a non-monetary transaction or a monetary transaction.

In response to the monitoring of the actions, the packet data management unit 214 may be configured to link the monitored action information with the authenticated user and the user credentials to generate linked data. In an embodiment, the linked data may comprise information associated with the one or more actions performed by the user in the authenticated session and metadata corresponding to the authenticated session. In an embodiment, the information associated with the one or more actions performed by the user in the authenticated session comprises monitored action information. In an embodiment, the metadata corresponding to the authenticated session may comprise layout information, URL information, Message version number, Message identifier, one or more message flags, Message security model. Application Context ID, Application Name and Message security Parameters. In an embodiment, the layout information may comprise the Application Context ID, geo location from where the URL is accessed, positioning of one or more actionable elements on the user interface of the application.

In an embodiment, the action information may include, but is not limited to, the click events performed by the user or the click events as elaborated earlier. In an embodiment, the authenticated user may be identified from the secure protocol format using the field "Authentication Flag" and the "Message security model". All this information is collated together to form the linked data. The scoped data unit includes the data unit to be transmitted along with parameters that identify Application Context ID, Application Name and the Encrypted. Linked data. Such information may be accessed by the receiving entity/transaction server 108 only by using a secure private key that is sent to the transaction server 108 by the user computing device.

In an embodiment, the one or more actions may be categorized into one of: low risk actions, medium actions and high risk actions. In an embodiment, the high risk actions comprise one or more actions related to a financial transaction, application based authentication, privilege elevation, and role elevation and the categorization may be performed based on the Application Context ID, and the Application Name. In an embodiment, if categorization is high then transaction not executed whereas if categorization is low or medium then transaction is put on hold and again confirmation is saught from user via email or any other suitable means of communication. In an embodiment, if the actions performed by the user relate to a non-monetary transaction then the actions may be categorized as having medium risk. In an embodiment, if the actions performed by the user relate to a non-monetary transaction and further if the actions are in alignment with any historically performed transactions then such actions may be categorized as having low risk.

After the linked data is generated, then the packet data management unit 214 may be configured to encrypt the linked data using one or more encryption techniques to generate encrypted linked data. In an embodiment, the encrypted linked data may be stored within the "Scoped data unit" field of the secure protocol. As illustrated in FIGS. 8A and 8B, the secure protocol format comprising a Scoped Data Unit including application context ID and application name and encrypted linked data. The message body comprises encrypted linked data, data unit control fields and data unit control fields.

After the linked data is encrypted, the authorization unit 216 may be configured to generate a secret key for decrypting the encrypted linked data in the secure protocol data packet. In an embodiment, the secret key may be dependent on the encrypted linked data and the user credentials, and the secret key may be generated using a one-way hash function. For a one-way function $\Phi$, given an output value z, the function $\Phi$ has the property that it is computationally impossible to trace the data (i.e. the encrypted linked information) in the key (information) mz such that $\emptyset mz=z$. In an embodiment, the one-way function $\Phi$ is a function that may be computed, however that it's inverse $\emptyset^{-1}$ is computationally impossible to compute.

In an embodiment, the hash function, also denoted as $\Phi$, is a function that accepts as its input argument an arbitrarily long string of bits (or bytes) and produces a fixed-size output of information. The information in the output is typically called a message digest or digital fingerprint. In other words, a hash function maps a variable length in of input information to a fixed-sized output, $\Phi(m)$, which is the message digest or information digest. Typical output sizes range from 160 to 512 bits, but can also be larger. An ideal hash function is a function $\Phi$, whose output is uniformly distributed in the following way: Suppose the output size of $\Phi$ is n bits. If the message m is chosen randomly, then for each of the $2^n$ possible outputs z, the probability that $\Phi(m)=z$ is $2^{-n}$. In an embodiment, a number of one-way hash functions may be used. SHA-1 is one such example of the one-way hash function. The message digest size of SHA-1 is 160 bits. Other alternative hash functions are of the type that conform to the standard SHA-256, which produces a message digest size of 256 bits, and SHA-512, which produces a message digest size of 512 bits.

The generation of the secure key by the authorization unit 216 happens in three broad steps. The authorization unit 216 may utilize one or more key generators ($K_H$, $K_P$, $K_S$) for each of the three steps. Consider a block of plaintext (i.e. linked data) of size M=JN, where N is the size of the output of the block cipher used and is a natural number i.e., {1, 2, 3, . . . , 8, . . . 16, . . . ,}. Plaintext B=[$B_1$, $B_2$, . . . , $B_J$] is the current block that will be encrypted where each sub block $B_k$ has size N. Step 1 the authorization unit 216 derives a key that the block cipher uses to encrypt the first plaintext block of size N bytes, represented as H($B_1$, $K_H(1)$). The symbol H represents the encryption performed by the block cipher used in the first step. Then the authorization unit 216 may update key generator $K_H$ to key generator $K_H(2)$. Some of $K_H(2)$ may be used to derive a new key for the block cipher in order to encrypt the second sub block $B_2$, represented as H($B_2$, $K_H(2)$). This encryption of each sub block $B_k$ occurs times until the last one is encrypted as H($B_J$, $K_H(J)$). In an embodiment, the block cipher may use AES-256, where M=256 bytes (2048 bits). In an embodiment, the block cipher may use DES where M=64 bytes (512 bits).

In an embodiment, the authorization unit 216 in step 2 may use some of the current value of $K_P$ to update the permutation $\mu\{1, 2, \ldots, M\} \rightarrow \{1, 2, \ldots, M\}$. Then the permutation $\mu$ permutes the encrypted M bits received from step 1 to [$c1, c2, \ldots, c_M$], where each $cj=b\mu(j)$. Permutation $\mu$ diffuses the partially encrypted plaintext from step 1 over a block of size M bits. A portion of the key generator $K_P$ is updated using a one-way hash function: this means that the permutation u used for the next block of size M will usually be quite different. In an example. $\mu$ sends bit 181 to bit 267 and also maps bit 311 to bit 1.

In an embodiment, the authorization unit 216 in step 3 may use some of the key generator $K_S$ to generate a substitution box, represented as $\sigma_1$. $\sigma_1$: {0, 1, . . . , K-1} $\rightarrow$ {0, 1, . . . , K-1} that further encrypts the first element of the block from step 2 as $\sigma_1(c_1 \ldots c_k)$ where each $c_j$ is the jth bit received from step 2. In an embodiment, $\sigma_1$ is updated to $\sigma_2$: {0, 1, . . . , K-1} $\rightarrow$ {0, 1, . . . , K-1} so that $\sigma_2 \neq \sigma_1$. In an embodiment, $\sigma_1$ may not be updated so that $\sigma_2 = \sigma_1$. $\sigma_2$ further encrypts the second element $c_{K+1} \ldots c_{2K}$ of the M bit block from process P as $\sigma_2(c_{K+1} \ldots c_{2K})$ and so on all the way up to $\sigma_n(c_{(n-1)K+1} \ldots c_{nK})$. This completely encrypted block of M bits (i.e. the encrypted linked data) is [e1,e2, . . . , en] where the jth completely encrypted element is $e_j = \sigma_k(C_{(j-1)K+1} \ldots _{jK})$ and M=Kn. The key generator $K_S$ is updated using a one-way hash function. This means that the updated substitution box for the next block is usually quite different from the previous substitution box.

The Scoped Data Unit includes the data unit to be transmitted along with parameters that identify Application Context ID, Application Name and the encrypted linked data. Such information may be accessed by the receiving entity, transaction server 108 in this case, only by using the secret key that is generated above. In conventional systems, there is no way of checking if the received message packet is genuine and tamper proof. As authentication is done initially and hence it is believed that whatever actions happened after the authentication were genuine and the conventional systems would execute the transactions. In order to overcome this, linked data is generated and further to secure it, the linked data is encrypted and transmitted to the distributed ledger network.

Once the encrypted linked data and secret key are generated then, the transceiver 206 may be configured to transmit, using the secure protocol, the first secure protocol data packet comprising the encrypted linked data to a distributed ledger network 106 and further the transceiver 206 may be configured to transmit the secret key and the encrypted linked data to the transaction server 108. In an embodiment, a Blockchain Flag is set to '1' which is indicative of blockchain based authentication and authorization is used for execution of the transaction, In an embodiment, all the message packets that are exchanged are in accordance with the message format as illustrated in FIGS. 8A and 8B. As the secure protocol format includes details about the encrypted linked data thus, when a message packet that is received from a user computing device 102 and another message packet that may have been tampered with and is received at the transaction server 108, the transaction server 108 may differentiate between the genuine message packet and the tampered message packet.

During the aforementioned transmission, the secure protocol establishes a secure link between the user computing device 102 and the transaction server 108 for exchange of the secure data packet that comprises the encrypted linked data, and the secret key. In order to establish such a secure link, the user computing device may receive a public key from the transaction server 108. After receiving the public key, the packet data management unit 214 may encrypt a session key associated with the authentication session using the public key of the transaction server 108. In an embodiment, the transaction server 108 may decrypt the session key using a private key of the transaction server 108. Further, the packet data management unit 214 may encrypt each of the secret key and the secure protocol data packet (also referred as first secure protocol data packet) to be transmitted from the user computing device to the transaction server using the session key. Further, the transceiver 206 may be configured to transmit each of the encrypted secret key and the encrypted first secure protocol data packet to the transaction server 108. In an embodiment, the transaction server 108 decrypts the secret key and the first secure protocol data packet using the decrypted session key.

In an embodiment, while the user is performing additional one or more actions and after the linked data is generated, the local tamper detection unit 218 may be configured to identify one or more changes, associated with the linked data, which are not being performed by the authenticated user during the authenticated session. In an embodiment, the one or more changes may be identified based on the comparison of the monitored one or more actions being performed by the authenticated user with a plurality of historical actions and a plurality of historical transactions performed by the authenticated user. In an embodiment, the one or more changes associated with the linked data. may be performed by an unauthenticated user within the authenticated session.

In the event when one or more changes are identified then the local tamper detection unit 218 provides a first notification to the authenticated user indicative of data tamper. In another embodiment, the user of the user computing device 102 may receive a second notification indicative of data tamper when one or more changes are identified and one or more actions requested by an unauthenticated user are not executed, thereby preventing fraudulent execution of one or more transactions. In an embodiment, the identified one or more changes are reported to the user, The transceiver 306 of the transaction server 108 may be configured to receive the first secure protocol data packet comprising encrypted linked data and the secret key from a user computing device 102. In an embodiment, the first secure protocol data packet may be received during the authenticated session to communicate with the user computing device 102 using the secure protocol. In an embodiment, the communication comprises exchange of messages using one or more secure protocol data packets for execution of one or more transactions. In an embodiment, the secure protocol establishes a secure link between the user computing device 102 and the transaction server 108 for exchange of the secure protocol data packet comprising the encrypted linked data and the secure key. In an embodiment, the secure link is created by transmitting the public key of the transaction server to the user computing device 102. In an embodiment, the public key of the transaction server may be used to encrypt the session key associated with the authentication session. Further, the processor 302 may be configured to decrypt the session key using a private key of the transaction server 108. In an embodiment, the each of the secret key and the first secure protocol data packet to be received from the user computing device 102 may be encrypted using the session key. Further, the processor 302 may be configured to decrypt the secret key and the first secure protocol data packet using the decrypted session key.

After decryption of the secret key and the first secure protocol data packet, the decryption unit 310 may be configured to decrypt the encrypted linked data in the first secure protocol data packet using the received secret key. In an embodiment, the secret key may be dependent on encrypted linked data and the user credentials, and the secret key may be generated using a one-way hash function, In an embodiment, the decrypted linked data may comprise information associated with one or more actions performed by the user in the authenticated session and metadata corresponding to the authenticated session. In an embodiment, the information associated with the one or more actions performed by the user in the authenticated session comprises monitored action information. In an embodiment, the metadata corresponding to the authenticated session may comprises layout information, URL information, the Message version number, the Message identifier, one or more message flags, Message security model, Application Context ID, Application Name and Message security Parameters. In an embodiment, the layout information may comprise the Application Context ID, geo location from where the URL is accessed, positioning of one or more actionable elements.

After the encrypted linked data is decrypted then, the transceiver 306 may be configured to retrieve a second secure protocol data packet, associated with the first secure protocol data packet, from a distributed ledger network 106. In an embodiment, the second secure protocol data packet associated with the first secure protocol data packet received from the user computing device may be identified based on field names comprising Message identifier and Message version number in the first secure protocol data packet. In an embodiment, the second secure protocol data packet corresponds to a secure protocol data packet that comprises the encrypted linked data transmitted by the user computing device 102 to the distributed ledger network 106. In an embodiment, in the second secure protocol data packet a Blockchain Flag is set, which is indicative that blockchain based authentication and authorization is used. In an embodiment, in the second secure protocol data packet an Authorization Flag is set, which is indicative that message in the second secure protocol data packet has been authorized by an authenticated user. In an embodiment, in the second secure protocol data packet an Authentication Flag is set, which is indicative that authentication was used to protect authenticity of message in the second secure protocol data packet.

Further, the decryption unit 310 may be configured to decrypt the encrypted linked data in the second secure protocol data packet using the received secret key using one or more decryption techniques. Once the step of retrieving a second secure protocol data packet from the distributed ledger network 106 is performed and decryption is done then there are three scenarios.

Scenario 1: There is no associated second secure protocol data packet in the distributed ledger network 106 for the first secure protocol data packet. In such a scenario, the received first secure protocol data packet is considered to be tampered with.

Scenario 2: There is only one associated second secure protocol data packet in the distributed ledger network 106 for the first secure protocol data packet. In such a scenario, the received first secure protocol data packet is considered genuine and is not tampered with.

Scenario 3: There is only one associated second secure protocol data packet in the distributed ledger network 106 for the first secure protocol data packet, however there are plurality of first secure protocol data packet that are received from the same user computing device 102 within the same authenticated session. In such a scenario, only the first secure protocol data packet from the plurality of first secure protocol data packets that has a corresponding second secure protocol data packet is considered as genuine and the rest of the packets from the plurality of first secure protocol data packets are considered to be tampered packets.

As illustrated above, in each of the three scenarios, the global tamper detection unit 312 may be configured to identify one or more changes between the decrypted linked data of the first secure protocol data packet that is received from the user computing device 102 and the decrypted linked data of the second secure protocol data packet. In an embodiment, if one or more changes are identified then the first secure protocol data packet received from the user computing device 102 is considered as tampered. In an embodiment, the identified one or more changes may be performed by an unauthenticated user within the authenticated session.

By way of an example, the decrypted packet received from the computing device and the decrypted packet received from the blockchain network may be different. Such differences may include difference in the geo location, secure HTTP protocol may not have been used in the packet received from the user computing device 102, difference in the Application Context ID, changes in layout information, and the like. Thus, as the global tamper detection unit 312 may identify that either some other rogue user was phishing on the user computing device 102 after the authenticated user logged in and modified the layout information and the authenticated user was not aware of the same and thus populated the data and sent the transaction for processing. In an embodiment, as the transaction server 108 is able to identify the changes thus the transaction will not be executed.

In an embodiment, identifying the one or more changes further comprises determining by the global tamper detection unit 312 if a plurality of first secure protocol data packets are received from the user computing device that correspond to only one second secure protocol data packet that is retrieved from the distributed ledger network. Further, the global tamper detection unit 312 may determine if a first secure protocol data packet from the plurality of first secure protocol data packets whose decrypted linked data is same as the decrypted linked data of the only one second secure protocol data packet that is retrieved from the distributed ledger network 106. In an embodiment, such a first secure protocol data packet is not considered to be tampered with and one or more actions in such a first secure protocol data packet is authorized by the authenticated user. In an embodiment, the remaining of the secure protocol data packets from the plurality of first secure protocol data packets may be considered to be tampered with and one or more actions in such remaining of the secure protocol data packets is not authorized by the authenticated user, and one or more actions that are not authorized by the authenticated user may not be executed by the transaction server.

In response to the identification of the one or more changes, the notification unit 314 may be configured to provide a notification to a user indicative of data tamper when one or more changes are identified and prevent execution of one or more actions requested by the user. In an embodiment, the identified one or more changes may be reported to the user, thereby preventing fraudulent execution of one or more transactions.

Further, in the event that no changes are identified in the first secure protocol data packet received from the user computing device and the second secure protocol data packet then the execution unit 316 may be configured to execute one or more actions authorized by an authenticated user.

In an embodiment, however, in an event when decrypted linked data has been tampered with, the transaction may be aborted and/or appropriate notification is generated to apprise a system administrator about the tamper so that corrective actions can be taken for investigating the reason behind the tamper. In an embodiment, when a tamper has been detected, one or more events may be triggered based on a category of the detected tamper. By way of example, when the detected tamper corresponds to a "low risk" category due to failed attempt in phishing or other such extraneous intervention, the transaction server 108, in conjunction with the execution unit 316 may automatically block the access to the network to the Internet Protocol (IP)/Media Access Control (MAC) addresses associated with concerned miscreants. In another example, when the detected tamper corresponds to a "high risk" category due to misdirection of funds to an un-identified account, the transaction server 108, in conjunction with the execution unit 316 may, apart from not executing the transaction, may notify network administrators about such intervention along with metadata associated with the transaction, such as IP/MAC addresses associated with concerned miscreants. In another example, for the "high risk" scenario discussed above, the transaction server 108 may isolate and/or quarantine the user computing devices 102 involved in the transaction.

The above technical solution helps to avoid execution of fraudulent transactions caused by phishing and also avoids execution of transactions even if data packet are tampered during transmission.

FIG. 4 illustrates an interaction diagram 400 between a user computing device 102, a distributed ledger network 106 and a transaction server 108.

At step 402, the user computing device 102 may be configured to authenticate the user based on the received credentials to create the authenticated session. At step 404, the user computing device 102 may be configured to monitor one or more actions performed by the authenticated user during the authenticated session to execute a transaction At step 406, the user computing device 102 may be configured to link the monitored action information with the authenticated user and the user credentials to generate linked data for transaction Tr. At step 408, the user computing device 102 may be configured to encrypt the linked data using one or more encryption techniques to generate encrypted linked data. At step 410, the user computing device 102 may be configured to generate a secret key for decrypting the encrypted linked data in the secure protocol data packet. In an embodiment, the encrypted linked data may relate to the actions required for executing transaction $T_1$. At step 412, the user computing device 102 may be configured to store the encrypted linked data in the scoped data unit and create the first secure protocol data packet. At step 414, the user computing device 102 may be configured to transmit the first secure protocol data packet comprising the encrypted linked data to a distributed ledger network.

At step 416, an unauthenticated user (hacker) performs one or more actions within the authenticated session on the user computing device 102. In an embodiment, the one or more actions may relate to a transaction $T_2$. At step 418, the user computing device 102 may be configured to link monitored actions of the unauthenticated user (hacker) with the user credentials of the authenticated user to generate linked data. Here the linked data that is generated for the unauthenticated user (hacker) will be different from that of the authenticated user as the actions performed by the authenticated user and the unauthenticated user are different, At step 420, the user computing device 102 may be configured to encrypt the linked data of the unauthenticated user (hacker) using one or more encryption techniques to generate encrypted linked data. Such encrypted linked data of the unauthenticated user (hacker) may relate to execution of transaction $T_2$. At step 422, the user computing device 102 may be configured to generate a secret key for decrypting the encrypted linked data of the unauthenticated user (hacker) in the secure protocol data packet. Here as the secret key is based on the actions of the user hence the secret key of the authenticated user and the unauthenticated user will be different. At step 424, the user computing device 102 may be configured to transmit the secret key and the encrypted linked data of the unauthenticated user (hacker) to the transaction server.

At step 426, the distributed ledger network 106 may be configured to receive the first secure protocol data packet comprising the encrypted linked data from the user computing device 102. At step 428, the transaction server 108 may be configured to receive the first secure protocol data packet and the secret key from an authenticated user. However, the transaction server 108 still cannot validate whether the first secure protocol data packet has been tampered with. At step 430, the transaction server 108 may be configured to receive the secret key and the secure protocol data packet that comprises encrypted linked data of the unauthenticated user (hacker). At step 432, the transaction server 108 may be configured to decrypt the encrypted linked data in the first secure protocol data packet using the secret key received from the authenticated user. At step 434, the transaction server 108 may be configured to decrypt the encrypted linked data of the secure protocol data packet received from the unauthenticated user (hacker) using the secret key received from the unauthenticated user.

At step 436, the transaction server 108 may be configured to determine if the linked data (linked data should be associated with the same user device and the same user credentials) from the authenticated user and the unauthenticated user are different. If there is difference in the linked data then actions included in both the received secure protocol data packets are kept on hold. At step 438, the transaction server 108 may be configured to identify changes in the received first secure protocol data packet and corresponding second secure protocol data packet that is retrieved from the distributed ledger network 106.

At step 440, if no changes are identified by the transaction server 108, then actions included in the linked data of the first secure protocol data packet are executed and the actions included in the linked data of the secure protocol data packet received from the unauthenticated user (hacker) are not executed. At step 442, the transaction server 108 may be configured to provide a notification to the authenticated user indicative of data tamper when one or more changes are identified and prevent execution of one or more actions requested by the unauthenticated user. In an embodiment, the identified one or more changes may be reported to the user, thereby preventing fraudulent execution of one or more transactions.

FIG. 5 is a flowchart illustrating a method 500 performed by the transaction server 108 for preventing fraudulent execution of one or more transactions using a secure protocol, in accordance with some embodiments of the present disclosure. The method starts at step 502 and proceeds to step 504.

At step 504, the transaction server 108 may be configured to receive a first secure protocol data packet comprising encrypted linked data and a secret key from a user computing device 102. At step 506, the transaction server 108 may be configured to decrypt the encrypted linked data in the first secure protocol data packet using the received secret key. At step 508, the transaction server 108 may be configured to retrieve a second secure protocol data packet, associated with the first secure protocol data packet received from the user computing device 102, from a distributed ledger network 106. At step 510, the transaction server 108 may be configured to decrypt the encrypted linked data in the second secure protocol data packet using the received secret key using one or more decryption techniques.

At step 512, the transaction server 108 may be configured to identify one or more changes between the decrypted linked data of the first secure protocol data packet that is received from the user computing device 102 and the decrypted linked data of the second secure protocol data packet. If one or more changes are identified then proceed to step 516 else proceed to step 518. At step 516, the transaction server 108 may be configured to provide a notification to a user indicative of data tamper when one or more changes are identified and prevent execution of one or more actions requested by the user. At step 518, if no changes are identified in the first secure protocol data packet received from the user computing device and the second secure protocol data packet then the transaction server 108 may be configured to execute one or more actions authorized by an authenticated user. Control passes to end step 520.

FIG. 6 is a flowchart illustrating a method 600 performed by the user computing device 102 for preventing fraudulent execution of one or more transactions using a secure protocol, in accordance with some embodiments of the present disclosure. The method starts at step 602 and proceeds to step 604.

At step 604, the user computing device 102 may be configured to receive user credentials from a user to initiate an authenticated session to communicate with a transaction server 108 using a secure protocol. At step 606, the user computing device 102 may be configured to authenticate the user based on the received credentials to create the authenticated session. At step 608, the user computing device 102 may be configured to link the monitored action information with the authenticated user and the user credentials to generate linked data in an embodiment, the linked data may comprise information associated with the one or more actions performed by the user in the authenticated session and metadata corresponding to the authenticated session. At step 610, the user computing device 102 may be configured to encrypt the linked data using one or more encryption techniques to generate encrypted linked data. At step 612, the user computing device 102 may be configured to generate a secret key for decrypting the encrypted linked data in the secure protocol data packet. In an embodiment, the secret key is dependent on the encrypted linked data and the user credentials. In an embodiment, the secret key is generated using a one-way hash function. At step 614, the user computing device 102 may be configured to transmit the secure protocol data packet comprising the encrypted linked data to a distributed ledger network 106 and further transmitting the secret key and the encrypted linked data to the transaction server 108. Control passes to end step 616.

FIG. 7 illustrates an interaction diagram 700 for establishing a secure link between a user computing device 102 and a transaction server 108 for exchange of encrypted linked data and a secret key.

At step 702, the user computing device 102 may he configured to receive a public key from the transaction server 108. At step 704, the user computing device 102 may be configured to encrypt a session key associated with the authentication session using the public key of the transaction server 108 and further transmit the encrypted session key to the transaction server 108. At step 706, transaction server 108 may be configured to decrypt the session key using a private key of the transaction server 108. At step 708, the user computing device 102 may be configured to encrypt each of the secret key and the first secure protocol data packet to be transmitted from the user computing device 102 to the transaction server 108 using the session key. At step 710, the user computing device 102 may he configured to transmit the each of the encrypted secret key and the encrypted first secure protocol data packet to the transaction server 108. At step 712, the transaction server 108 may be configured to decrypt the encrypted secret key and the encrypted first secure protocol data packet using the decrypted session key. By following the above steps, the secure link between the user computing device 102 and the transaction server 108 for exchange of encrypted linked data and the secret key is established.

FIGS. 8A and 8B collectively depict exemplary format of the one or more fields of the secure protocol data packet. FIGS. 8A and 8B depict a plurality of fields comprising Message version number 802, Message identifier 804, Max Msg_Size 806, Message Flags, 808, Message security model 810, Message security parameters 812, Application Context ID 814, Application Name 816, Encrypted Linked data 818, Data unit control fields 820, and Variable Bindings 824. The Encrypted Linked data 818, Data unit control fields 820, and Variable Bindings 824 together form the message body that corresponds to the PDU.

The Message version number field is set to 1 and identifies the message as a secure protocol version 1 Message. The Message identifier field is used between two entities such as the user computing device 102 and the transaction server 108 to coordinate exchanges of messages. Values for Message identifier field may be generated in a manner that avoids re-use of any outstanding values. Doing so may provide protection against some replay attacks. The Max Msg_Size field of the message conveys the maximum message size supported by the sender (user computing device and/or transaction server) of the message, i.e., the maximum message size that the sender can accept when another entity sends another secure data packet in response to the first data packet. In an embodiment, when a secure data packet is being generated, the msgMaxSize is provided by the packet data management unit 214 which generates the message. At the receiving entity, the msgMaxSize is used to determine the maximum message size the sender can accommodate.

The message flags field contains several bit fields which control processing of the secure data packet. In an embodiment, each of the one or more secure protocol data packets may comprise one or more flags. The one or more message flags may comprise a blockchain flag, a report flag an authorization flag, an authentication flag, and a privacy flag. In an embodiment, the values of the message flags may be changed by the packet data management unit 214 or the processor 302.

In an embodiment, when the blockchain flag is set, then it indicates that blockchain based authentication and authorization is used. In an embodiment, when the report flag is set, then it indicates that a device receiving this message must send back a report of the error status of the agent. In an embodiment, when the authorization flag is set, then it indicates that message data has been authorized by an authenticated user. For this bit to be set as 1, authentication Flag MUST be=1. In an embodiment, in the secure protocol data packet the authentication flag is set, which is indicative that authentication was used to protect authenticity of the messages in the secure protocol data packet. In an embodiment, when the privacy flag is set, then it indicates that the message is encrypted to protect privacy of message.

Message security model field indicates which security model is used for the message. For the user-based security (USM) model this value is 1 and for View-Based Access Control (VACM) Model this value is 2. Message security Parameters field defines which fields will be accessible to the receiving entity. For USM, the entity receiving the data unit will have access only to Message identifier, Message Flags and Encrypted Linked data fields. For VACM, the entity receiving the data unit will have access only to previous transaction patterns/parameters. Thus, users are defined to groups that are allowed to access different views or only parts of the information in the data unit based on the privileges. This ensures protection against disclosure of message PDU.

The scoped data unit includes the data unit to be transmitted along with parameters that identify the Application Context ID, the Application Name and the Encrypted Linked data. Such information may be accessed by the receiving entity/transaction server 108 only by using the secure key in the distributed ledger network 108. The data unit is "scoped" as it always linked within the scope of the application and the context of the application. This field is encrypted and the Privacy Flag should be set to 1.

Application Context ID field may be represented as an octet string with variable size and is used to identify which application is associated with the secure data packet being transmitted. Application Name field may be represented as an octet string with variable size and an object identifier specifying the application context associated with the secure data packet being transmitted. Encrypted Linked data field may he represented as an octet string with variable size and includes the encrypted linked data. In an embodiment, the encrypted linked data comprises information associated with the one or more actions performed by the user in the authenticated session and metadata corresponding to the authenticated session. The Encrypted Linked data, Data unit control fields, and Variable Bindings together form the message body that corresponds to the PDU form part of the message body (PDU) which has variable size.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

Advantages

The disclosed claimed limitations and the disclosure provided herein provides a secure protocol that generates a secure link for communication of messages between a user computing device and a transaction server. Further, the claimed limitations facilitate a secure link between the authentication of a valid user and the authorization of an action by the valid user. Further, the claimed limitations facilitate transmission of packet data in communication networks using the secure protocol such that the execution of fraudulent transactions caused by phishing may be avoided. Additionally, in the disclosure herein, as the secure key is generated based on the linked data hence no other such key can be generated which makes the generated key unique. Further, one or more transactions are executed only if the unique generated key is used to decrypt the received linked data and there are no changes identified with the corresponding data packet retrieved from the distributed ledger network. in an embodiment, the claimed limitations ensure that none of the packets are tampered with during the transfer from the user computing device to the transaction server and even if the packet data is tampered with which is not feasible, then in such a scenario the transaction associated with such data packets will not be executed, Thus, the claimed limitations ensure that if an unauthenticated user is trying to perform another transaction while the authenticated user is performing a genuine transaction then the authenticated user is notified about the same. Thus, fraudulent execution of transactions is prevented. The claimed limitations provide an alternative protocol to overcome the limitations of SSL and to perform validation at a transaction server before any transaction is executed.

Thus, the disclosed method and system tries to overcome to technical problem of tampering of data packets during transmission. Also, the disclosed method and system tries to overcome to technical problem of fraudulent execution of transactions by linking the monitored action information with the authenticated user and the user credentials to generate linked data and by user a secure key that uses a one way hash function. Specifically, the method and system ensures that all the communication i.e. exchange of messages happens in accordance with secure protocol and thus a secure link between the user computing device and the transaction server for exchange of the secure protocol data packets comprising the encrypted linked data and the secure key. Conventional systems cannot determine if a data packet has been tampered with as there is no linkage between the actions performed by a user and the transactions that he has authorized. Further, in the conventional systems the secure link is missing. In contrast, in the disclosed method and system one or more changes between the decrypted linked data of the first secure protocol data packet that is received from the user computing device and the decrypted linked data of the second secure protocol data packet that is received from the distributed ledger network are identified and only after such validation the actions included in the first secure protocol data packet are executed, thereby preventing fraudulent execution of transactions.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

A description of an embodiment with several components in communication with a other does not imply that all such components are required, On the contrary, a variety of optional components are described to illustrate the wide variety of possible embodiments of the invention, Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems, A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A transaction server for secure communication, the transaction server comprising:
   a processor; and
   a memory communicatively coupled to the processor, wherein the memory stores processor instructions, which, on execution, causes the processor to:
   receive a first secure protocol data packet comprising encrypted linked data and a secret key from a user computing device, wherein the first secure protocol data packet is received during an authenticated session to communicate with a user computing device using a secure protocol, wherein the communication comprises exchange of messages using one or more secure protocol data packets for execution of one or more transactions;
   decrypt the encrypted linked data in the first secure protocol data packet using the received secret key, wherein the secret key is dependent on encrypted linked data and user credentials, and wherein the secret key is generated using a one-way hash function
   retrieve a second secure protocol data packet, associated with the first secure protocol data packet received from the user computing device, from a distributed ledger network, wherein the second secure protocol data packet associated with the first secure protocol data packet received from the user computing device is identified based on field names comprising Message identifier and Message version number in the first secure protocol data packet, wherein the second secure protocol data packet corresponds to a secure protocol data packet that comprises the encrypted linked data transmitted by the user computing device to the distributed ledger network, wherein in the second secure protocol data packet a Blockchain Flag is set, which is indicative that blockchain based authentication and authorization is used, wherein in the second secure protocol data packet an Authorization Flag is set, which is indicative that message in the second secure protocol data packet has been authorized by an authenticated user, and wherein in the second secure protocol data packet an Authentication Flag is set, which is indicative that authentication was used to protect authenticity of message in the second secure protocol data packet;
   decrypt the encrypted linked data in the second secure protocol data packet using the received secret key using one or more decryption techniques;
   identify one or more changes between the decrypted linked data of the first secure protocol data packet that is received from the user computing device and the decrypted linked data of the second secure protocol data packet, wherein if one or more changes are identified then the first secure protocol data packet received from the user computing device is considered as tampered, wherein the identified one or more changes are performed by an unauthenticated user within the authenticated session;
   provide a notification to a user indicative of data tamper when one or more changes are identified and prevent execution of one or more actions requested by the user, wherein the identified one or more changes are reported to the user, thereby preventing fraudulent execution of one or more transactions; and
   execute one or more actions authorized by an authenticated user if no changes are identified in the first secure protocol data packet received from the user computing device and the second secure protocol data packet.

2. The transaction server of claim 1, wherein the encrypted linked data is stored within a secure protocol data packet from the one or more secure protocol data packets.

3. The transaction server of claim 1, wherein the secure protocol establishes a secure link between the user computing device and the transaction server for exchange of the encrypted linked data and the secret key is created by:
   transmitting a public key of the transaction server to the user computing device, wherein the public key of the transaction server is used to encrypt a session key associated with the authentication session;
   decrypting the session key using a private key of the transaction server, wherein the each of the secret key and the first secure protocol data packet to be received from the user computing device are encrypted using the session key; and
   decrypting the secret key and the first secure protocol data packet using the decrypted session key.

4. The transaction server of claim 1, wherein the decrypted linked data comprises information associated with one or more actions performed by the user in the authenticated session and metadata corresponding to the authenticated session, wherein the information associated with the one or more actions performed by the user in the authenticated session comprises monitored action information, and wherein the metadata corresponding to the authenticated session comprises layout information, URL information, the Message version number, the Message identifier, one or more message flags, Message security model, Application Context ID, Application Name and Message security Parameters, and wherein layout information comprises the Application Context ID, geo location from where the URL is accessed, positioning of one or more actionable elements.

5. The transaction server of claim 1, wherein the linked data decrypted by the transaction server is venerated by linking monitored action information with the authenticated user and the user credentials, wherein the monitored action information comprises one or more actions performed by the authenticated user during the authenticated session.

6. The transaction server of claim 5, wherein the one or more actions comprises at least one of location of a click event performed by a user, type of event performed by the user, sequence of the click events, copy events, paste events, log-in event, log-out event.

7. The transaction server of claim 1, further comprising categorizing the one or more actions into one of: low risk actions, medium actions and high risk actions, wherein the high risk actions comprise one or more actions related to a financial transaction, application based authentication, privilege elevation, and role elevation, wherein the categorization is performed based on the Application Context ID, and the Application Name.

8. The transaction server of claim 1, wherein each of the messages used for communication of the one or more secure protocol data packets comprises one or more message flags that comprise the blockchain flag, the authorization flag, the authentication flag, and a privacy flag.

9. The transaction server of claim 1, wherein identifying the one or more changes further comprises:
   determining if a plurality of first secure protocol data packets are received from the user computing device that correspond to only one second secure protocol data packet that is retrieved from the distributed ledger network; and
   determining a first secure protocol data packet from the plurality of first secure protocol data packets whose decrypted linked data is same as the decrypted linked data of the only one second secure protocol data packet that is retrieved from the distributed ledger network, wherein such a first secure protocol data packet is not considered to be tampered with and one or more actions in such a first secure protocol data packet is authorized by the authenticated user; wherein the remaining of the secure protocol data packets from the plurality of first secure protocol data packets are considered to be tampered with and one or more actions in such remaining of the secure protocol data packets is not authorized by the authenticated user, and wherein one or more actions that are not authorized by the authenticated user are not executed by the transaction server.

10. A user computing device for secure communication, the user computing device comprising:
   a processor; and
   a memory communicatively coupled to the processor, wherein the memory store processor instructions, which, on execution, cause the processor to:
   receive user credentials from a user to initiate an authenticated session to communicate with a transaction server using a secure protocol, wherein the communication comprises exchange of messages using one or more secure protocol data packets for execution of one or more transactions, including a first secure protocol data packet and a second secure protocol data packet;
   authenticate the user based on the received credentials to create the authenticated session;
   monitor one or more actions performed by the authenticated user during the authenticated session;
   link the monitored action information with the authenticated user and the user credentials to generate linked data, wherein the linked data comprises information associated with the one or more actions performed by the user in the authenticated session and metadata corresponding to the authenticated session;
   encrypt the linked data using one or more encryption techniques to generate encrypted linked data, wherein the encrypted linked data is stored within a secure protocol data packet from the one or more secure protocol data packets;
   generate a secret key for decrypting the encrypted linked data in the secure protocol darn packet, wherein the secret key is dependent on the encrypted linked data and the user credentials, and wherein the secret key is generated using a one-way hash function; and
   transmit the secure protocol data packet comprising the encrypted linked data to a distributed ledger network and further transmitting the secret key and the encrypted linked data to the transaction server,
   wherein the second secure protocol data packet is associated with the first secure protocol data packet and is identified based on field names comprising Message identifier and Message version number in the first secure protocol data packet, wherein the second secure protocol data packet corresponds to a secure protocol data packet that comprises the encrypted linked data transmitted by the user computing device to the distributed ledger network, wherein in the second secure protocol data packet a Blockchain Flag is set, which is indicative that blockchain based authentication and authorization is used, wherein in the second secure protocol data packet an Authorization Flag is set, which is indicative that message in the second secure protocol data packet has been authorized by an authenticated user, and wherein in the second secure protocol data packet an Authentication Flag is set, which is indicative that authentication was used to protect authenticity of message in the second secure protocol data packet.

11. The user computing device of claim 10, wherein the instructions cause the processor to identify one or more changes, associated with the linked data, which are not being performed by the authenticated user during the authenticated session, wherein the one or more changes are identified based on the comparison of the monitored. one or more actions being performed by the authenticated user with a plurality of historical actions and a plurality of historical transactions performed by the authenticated user, wherein the one or more changes associated with the linked data are performed by an un authenticated user within the authenticated session.

12. The user computing device of claim 11, wherein the instructions cause the processor to provide a first notification to the authenticated user indicative of data tamper when one or more changes are identified, and provide a second notification to the authenticated user indicative of data tamper when one or more changes are identified and one or more actions requested by an unauthenticated user are not executed, thereby preventing fraudulent, execution of one or more transactions, and wherein the identified one or more changes are reported to the user.

13. The user computing device of claim 10, wherein the one or more actions comprises at least one of location of a click event performed by a user, type of event performed by the user, sequence of the click events, copy events, paste events, log-in event, log-out event.

14. The user computing device of claim 10, wherein the information associated with the one or more actions performed by the user in the authenticated session comprises monitored action information.

15. The user computing device of claim 10, wherein the metadata corresponding to the authenticated session comprises layout information, URL information, Message version number, Message identifier, one or more message flags, Message security model, Application Context ID, Application Name and Message security Parameters, and wherein the layout information comprises the Application Context ID, geo location from where the URL is accessed, positioning of one or more actionable elements.

16. The user computing device of claim 15, wherein the one or more actions are categorized into one of: low risk actions, medium actions and high risk actions, wherein the high risk actions comprise one or more actions related to a financial transaction, application based authentication, privilege elevation, and role elevation, wherein the categorization is performed based on the Application Context ID, and the Application Name.

17. The user computing device of claim 10, wherein the secure protocol establishes a secure link between the user computing device and the transaction server for exchange of the encrypted linked data and the secret key is created by:
   receiving, by the user computing device, a public key from the transaction server;
   encrypting, by the computing device, a session key associated with the authentication session using the public key of the transaction server, wherein the transaction server decrypts the session key using a private key of the transaction server;
   encrypting, by the computing device, each of the secret key and the first secure protocol data packet to be transmitted from the user computing device to the transaction server using the session key; and
   transmitting, by the computing device, each of the encrypted secret key and the encrypted first secure protocol data packet to the transaction server, wherein transaction server decrypts the secret key and the first secure protocol data packet using the decrypted session key.

18. A method for secure communication, the method comprising:
   receiving, by a transaction server, a first secure protocol data packet comprising encrypted linked data and a secret key from a user computing device, wherein the first secure protocol data packet is received during an authenticated session to communicate with a user computing device using a secure protocol, wherein the communication comprises exchange of messages using one or more secure protocol data packets for execution of one or more transactions;
   decrypting, by the transaction server, the encrypted linked data in the first secure protocol data packet using the received secret key, wherein the secret key is dependent on encrypted linked data and user credentials, and wherein the secret key is generated using a one-way hash function;
   retrieving, by the transaction server, a second secure protocol data packet, associated with the first secure protocol data packet received from the user computing device, from a distributed ledger network, wherein the second secure protocol data packet associated with the first secure protocol data packet received from the user computing device is identified based on field names comprising Message identifier and Message version number in the first secure protocol data packet, wherein the second secure protocol data packet corresponds to a secure protocol data packet that comprises the encrypted linked data transmitted by the user computing device to the distributed ledger network, wherein in the second secure protocol data packet a Blockchain Flag is set, which is indicative that blockchain based authentication and authorization is used, wherein in the second secure protocol data packet an Authorization Flag is set, which is indicative that message in the second secure protocol data packet has been authorized by an authenticated user, and wherein in the second secure protocol data packet an Authentication Flag is set, which is indicative that authentication was used to protect authenticity of message in the second secure protocol data packet;
   decrypting, by the transaction server, the encrypted linked data in the second secure protocol data packet using the received secret key using one or more decryption techniques;
   identifying, by the transaction server, one or more changes between the decrypted linked data of the first secure protocol data packet, which is received from the user computing device, and the decrypted linked data of the second secure protocol data packet, wherein if one or more changes are identified then the first secure protocol data packet received from the user computing device is considered as tampered, wherein the identified one or more changes are performed by an unauthenticated user within the authenticated session;
   providing, by the transaction server, a notification to a user indicative of data tamper when one or more changes are identified and prevent execution of one or more actions requested by the user, wherein the identified one or more changes are reported to the user, thereby preventing fraudulent execution of one or more transactions; and
   executing, by the transaction server, one or more actions authorized by an authenticated user if no changes are identified in the first secure protocol data packet received from the user computing device and the second secure protocol data packet.

* * * * *